United States Patent [19]

King

[11] 4,169,634

[45] * Oct. 2, 1979

[54] BRAKE CONTROL SYSTEM AND APPARATUS FOR RAILWAY CARS

[76] Inventor: William R. King, 1909 Sunshine Sq., Longview, Tex. 75601

[*] Notice: The portion of the term of this patent subsequent to Oct. 31, 1995, has been disclaimed.

[21] Appl. No.: 877,998

[22] Filed: Feb. 15, 1978

Related U.S. Application Data

[63] Continuation-in-part of Ser. No. 843,285, Oct. 18, 1977, Pat. No. 4,123,115, which is a continuation-in-part of Ser. No. 775,379, Mar. 7, 1977, Pat. No. 4,143,923.

[51] Int. Cl.² ............................................. B60T 8/18
[52] U.S. Cl. .................................. 303/22 R; 188/195
[58] Field of Search ........... 188/195; 303/22 R, 22 A, 303/23 R, 23 A

[56] References Cited

U.S. PATENT DOCUMENTS

| | | | |
|---|---|---|---|
| 345,820 | 7/1886 | Westinghouse | 303/22 R |
| 413,253 | 10/1889 | Haberkorn | 303/22 R |
| 563,934 | 7/1896 | Lyers | 303/17 |
| 720,828 | 2/1903 | Mann | 303/22 R |
| 778,044 | 12/1904 | Kent | 303/22 R |
| 831,040 | 9/1906 | Custer | 303/22 R |
| 950,642 | 3/1910 | Smith | 303/22 R |
| 1,091,596 | 3/1914 | Snyder | 303/22 R |
| 1,230,949 | 6/1917 | Turner et al. | 303/22 R |
| 1,486,872 | 3/1924 | Farmer | 303/22 R |
| 1,602,108 | 10/1926 | Haskell | 303/22 R |
| 1,878,993 | 9/1932 | Anderberg et al. | 303/22 R |
| 2,077,922 | 4/1937 | Farmer | 303/22 R |
| 2,109,366 | 2/1938 | Cook et al. | 303/22 R |
| 2,160,210 | 5/1939 | Canetta et al. | 303/22 R |
| 2,364,927 | 12/1944 | Sudduth | 303/22 R |
| 2,528,143 | 10/1950 | Hewitt | 303/22 R |
| 3,006,694 | 10/1961 | Valentine et al. | 303/22 A |
| 3,125,379 | 3/1964 | Valentine | 303/22 R |
| 3,228,731 | 1/1966 | Valentine | 303/22 R |
| 3,330,604 | 7/1967 | Schultz et al. | 303/22 R |
| 3,338,638 | 8/1967 | Kirk et al. | 303/22 R |
| 3,338,639 | 8/1967 | Carothers | 303/22 R |
| 3,341,257 | 9/1967 | Weber | 303/22 R |
| 3,376,080 | 4/1968 | Kettering et al. | 303/22 R |
| 3,460,870 | 8/1969 | Kirk | 303/22 R |
| 3,597,013 | 8/1971 | Shah | 303/22 A |
| 3,606,485 | 9/1971 | Scott | 303/22 R X |
| 3,690,420 | 9/1972 | Natschke | 188/195 |
| 3,727,994 | 4/1973 | Kelver | 303/23 R |
| 3,814,483 | 6/1974 | Coiner et al. | 303/22 R X |
| 3,883,188 | 5/1975 | Wickham | 303/23 R |
| 3,929,384 | 12/1975 | Larsen | 303/22 R |
| 4,123,115 | 10/1978 | King | 303/22 R |

OTHER PUBLICATIONS

Harding, *Freight Car Brake Equipment*, International Text Books Co., (1946).
Missouri Pacific Railway Company, *Maintenance and Operation of Air and Dynamic Brakes Manual*, 1967.

*Primary Examiner*—Stephen G. Kunin
*Attorney, Agent, or Firm*—Richards, Harris & Medlock

[57] ABSTRACT

In a system and apparatus for railway car brake control, a brake control apparatus for cars having sprung and unsprung portions is interposed between a train brake valve in a brake pressure supply line and a brake cylinder line of each railway car. A supply chamber is connected to the brake pressure supply line and a control chamber is connected to the brake cylinder line. The chambers are abutted by surfaces of a spring biased diaphragm having different cross-sectional areas. A first valve is responsive to positioning of the diaphragm, which is also selectively fluid biased by a strut cylinder mounted between the sprung and unsprung portions of the railway car, to effect predetermined relationships between pressure drop in the brake pressure supply line and pressure drop in the brake cylinder line. When the particular car is loaded, the brake cylinder line experiences a pressure drop substantially equal to that effected in the brake pressure supply line by the train brake valve. When the particular car is empty, the brake cylinder line experiences a pressure drop smaller than the pressure drop in the brake pressure supply line by the inverse ratio of the diaphragm surface areas abutting the control and supply chambers, respectively. The strut cylinder senses the extent of car loading so that the brake cylinder line of a partially loaded car experiences a proportional pressure drop over the entire range of brake pressure supply line pressure drops.

27 Claims, 18 Drawing Figures

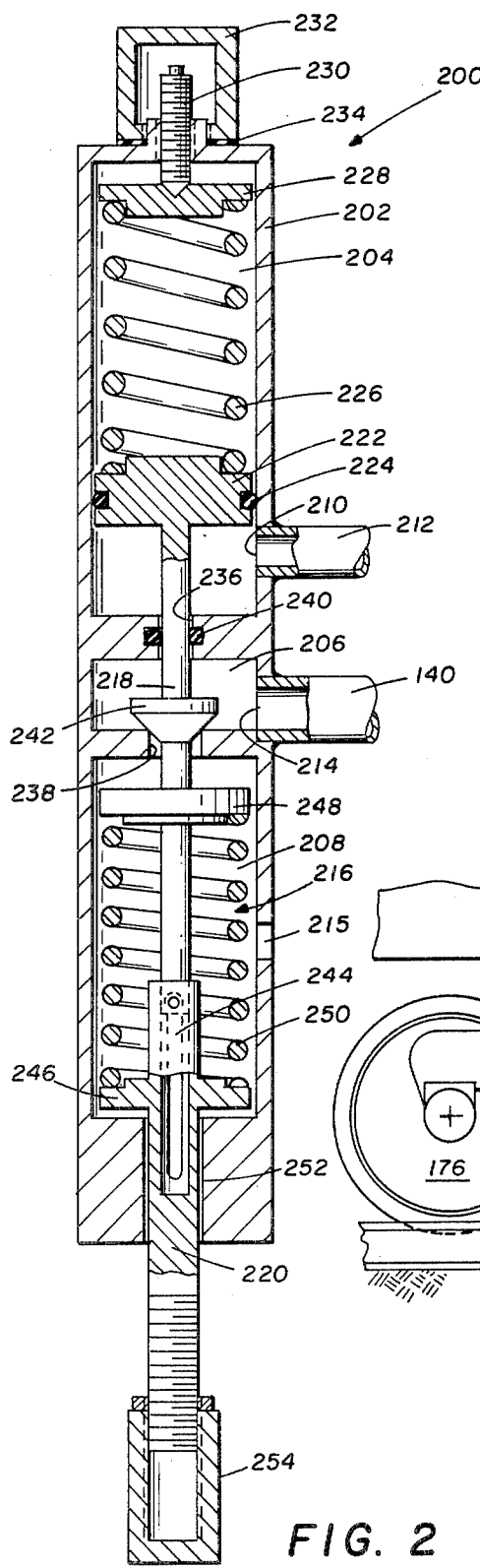
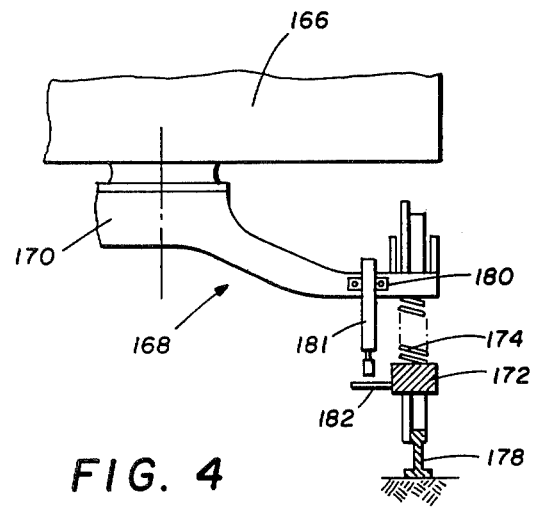
FIG. 4
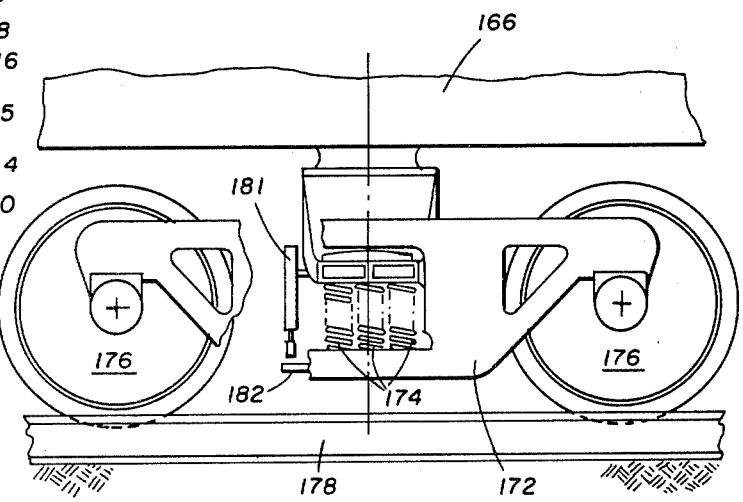
FIG. 3
FIG. 2

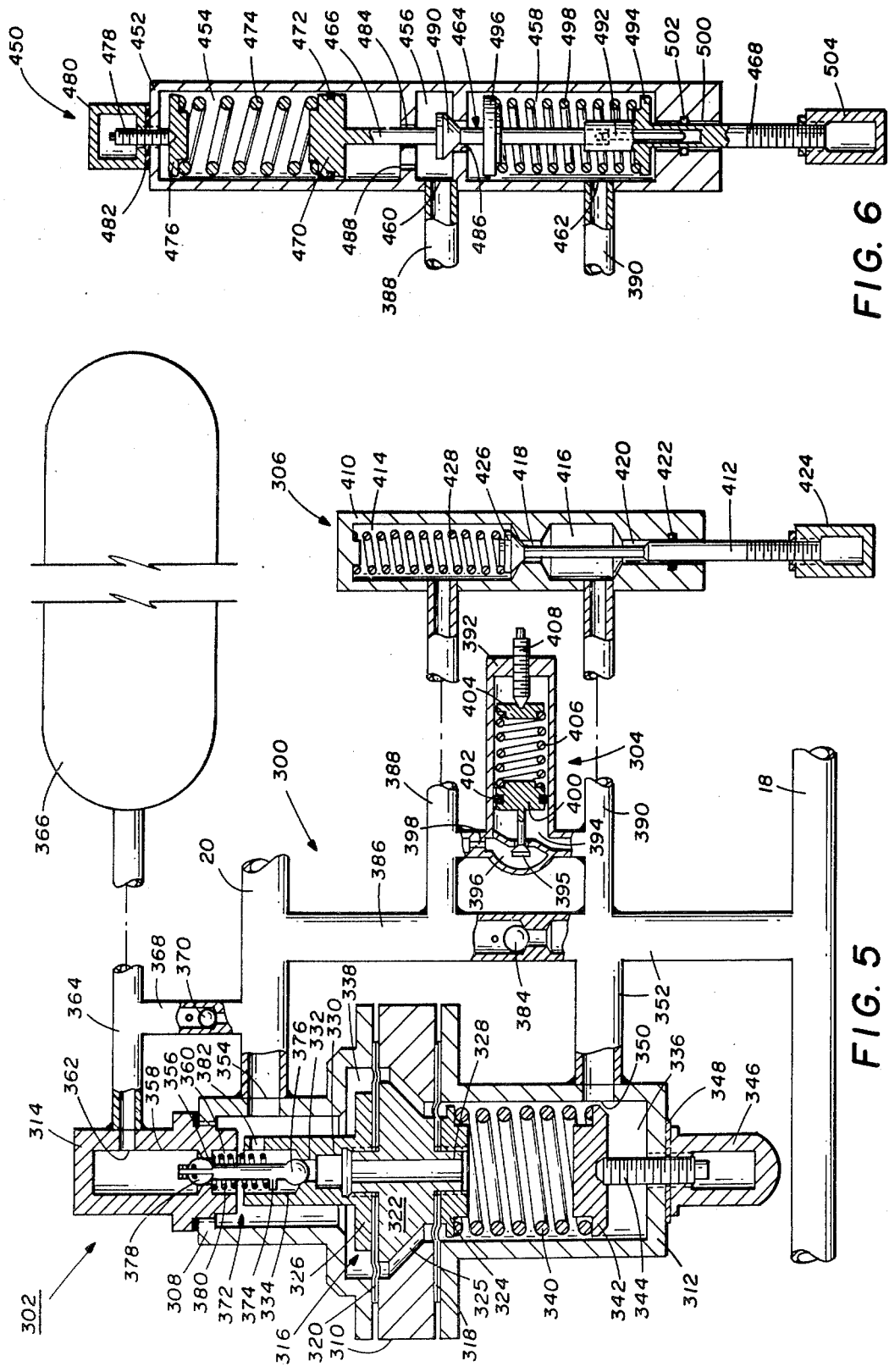

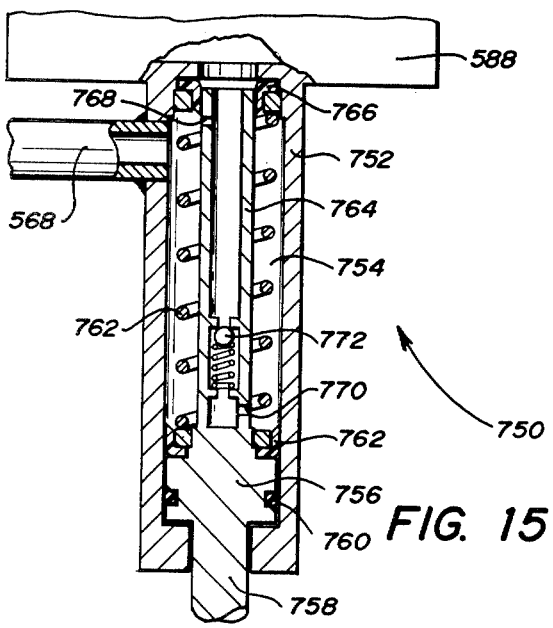
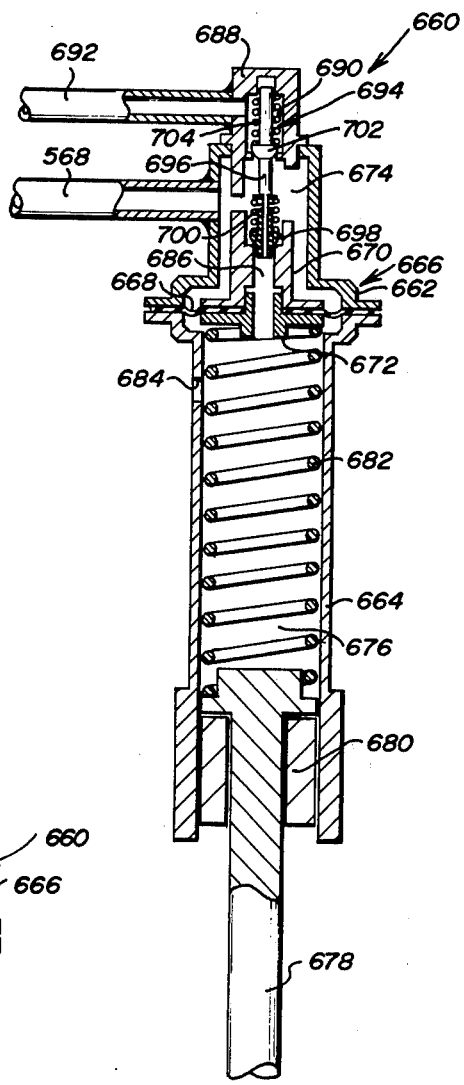
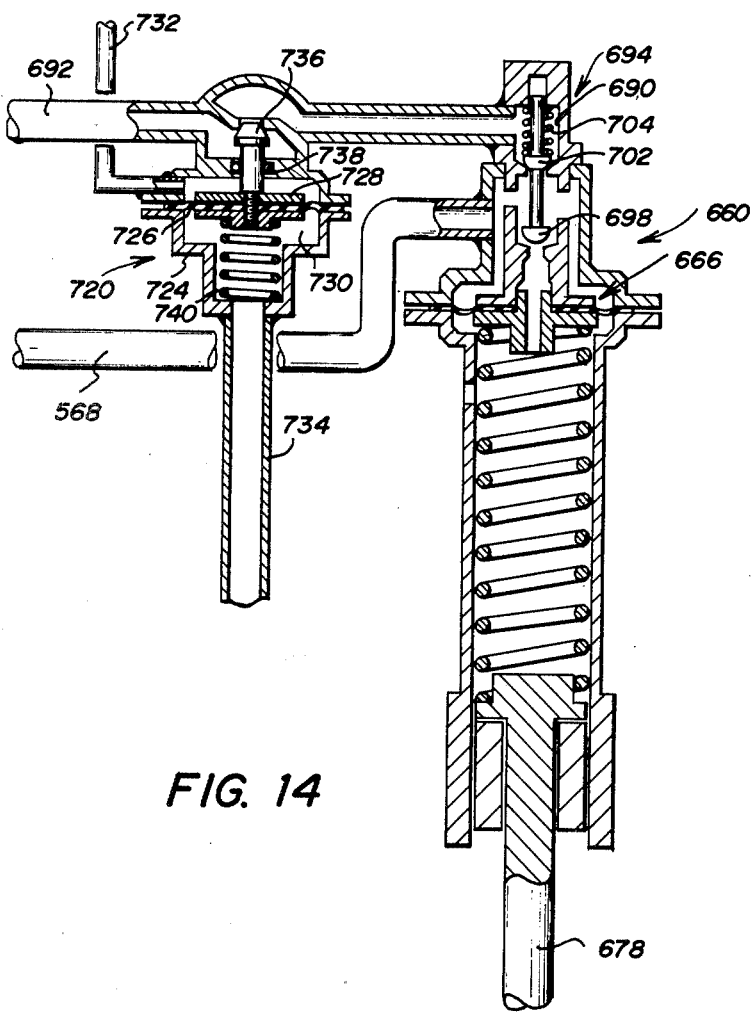
FIG. 15
FIG. 13
FIG. 14

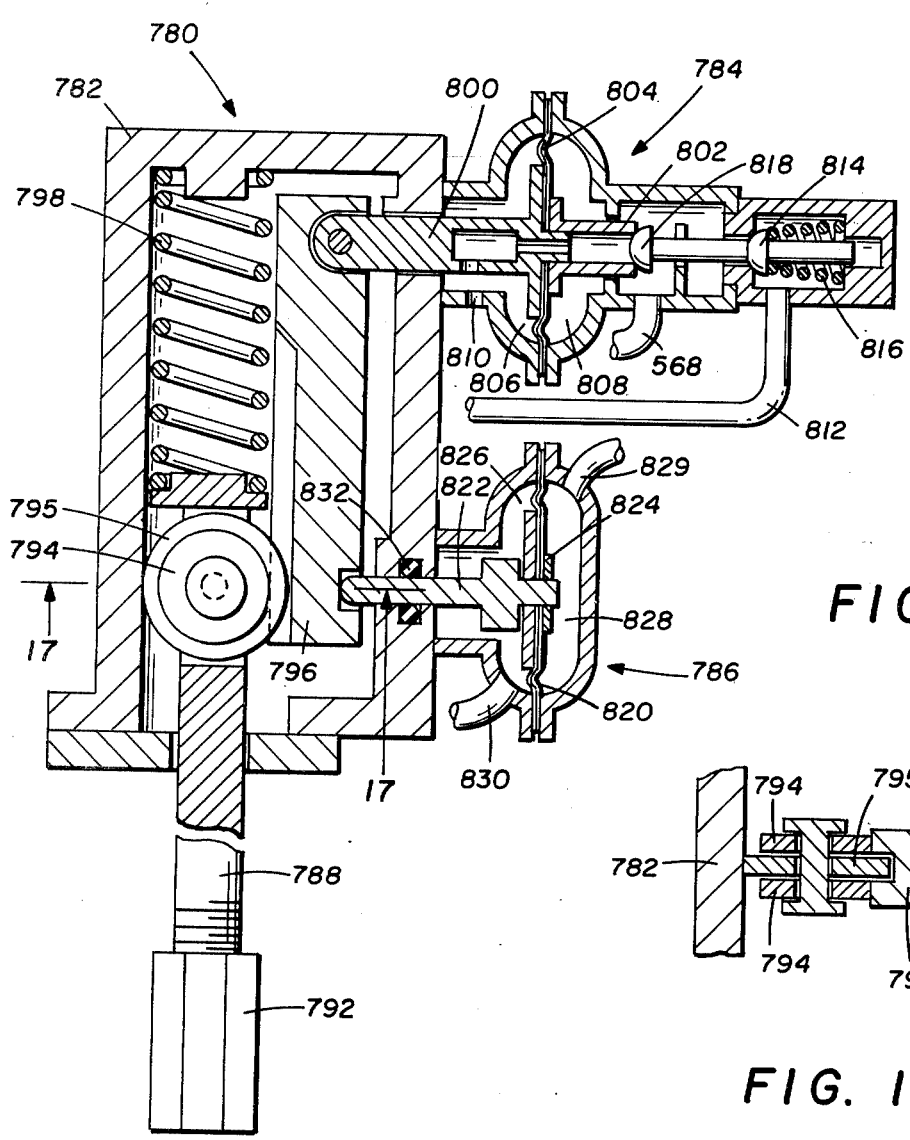
FIG. 16
FIG. 17
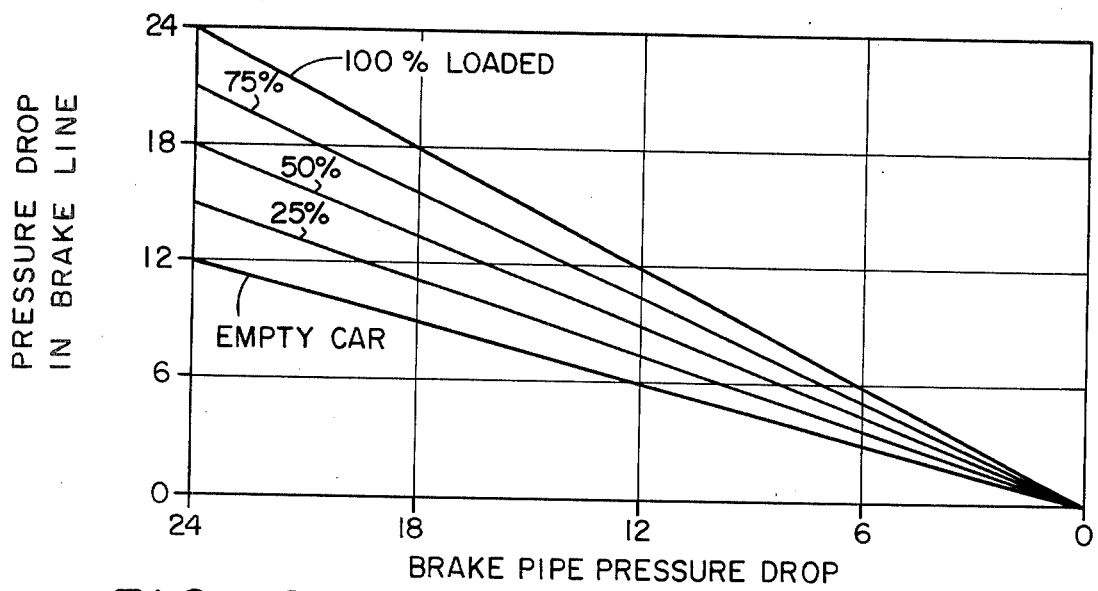
FIG. 18

BRAKE CONTROL SYSTEM AND APPARATUS FOR RAILWAY CARS

CROSS REFERENCE TO RELATED APPLICATIONS

This application is a continuation-in-part of co-pending application Ser. No. 843,285, filed Oct. 18, 1977, now U.S. Pat. No. 4,123,115; which is a continuation-in-part of co-pending application Ser. No. 775,379, filed Mar. 7, 1977, now U.S. Pat. No. 4,143,923.

BACKGROUND AND SUMMARY OF THE INVENTION

This invention relates generally to brake control devices, and more particularly to a brake control apparatus responsive to loading conditions of railway cars.

One of the successful brake control devices for railway cars has been the well-known AB freight brake control device. However, the AB brake valve is a single capacity device which applies a given brake signal to each car of a train without regard to the loading of the car. The undesirable result in a train comprised of loaded and unloaded cars is a shock or buffer effect which occurs because of inadequate braking on the loaded cars and excessive braking on the unloaded cars. Thus, a need exists for a brake control device for railway cars which applies the brakes of each individual car in accordance with the loading conditions thereof.

Many types of brake control apparatus have been heretofore known and used for automatically reducing the degree of braking on railway cars carrying a light load and thereby avoiding excessive braking on the wheels of relatively lightly loaded cars. Previous types of double capacity brake control apparatus usually comprise a so-called change-over valve device and strut cylinder for measuring the degree of load carried by a railway car according to the relative positioning of sprung and unsprung portions of the railway car undercarriage. These prior devices, sometimes referred to as empty and load brake control apparatus, have generally been relatively complicated in nature and high in cost.

Furthermore, most of the heretofore known empty and load brake control apparatus for railway cars are changed over to provide either empty or load braking, accordingly as the vehicle is empty or loaded, only while the train brake pipe pressure is increasing subsequent to a brake pipe pressure reduction to substantially zero, a condition obtained under emergency brake application and not during a full or partial service brake application.

Recognizing that railway cars are often operated partially loaded, as well as fully loaded or fully unloaded, it is the general purpose of this invention to provide brake control apparatus for railway cars which is responsive to the degree of loading in each individual car to effect proficient brake application in loaded, unloaded and partially loaded railway cars, thereby preventing the undesirable buffer effect along the train caused by uneven brake application, and which continuously senses the condition of loading during emergency and service brake application.

Another purpose of the invention is to provide brake control apparatus which may readily and economically be used in combination with existing railway brake valve devices, such as the widely used AB brake valve, without requiring changes in train operating procedure. The invention functions equally well whether the train brakes are applied by a single pressure reduction or, more typically, by staged pressure reductions.

A further aim of the invention is to provide a brake control apparatus which proportions the braking signal in accordance with the amount of loading of the particular railway car over the entire range of braking signals.

More specifically, the present invention comprises a brake control valve interposed between a brake pipe and a brake cylinder line. The control valve includes a movable diaphragm assembly suspended therein which separates two chambers connected to the brake pressure pipe and the brake cylinder line, respectively. The diaphragm assembly is responsive to a load sensing strut cylinder mounted between the sprung and unsprung portions of the railway undercarriage to actuate other valves within the control valve in order to effect a relatively reduced braking signal for an unloaded railway car with respect to the braking signal for a loaded railway car, and a proportional braking signal for a partially loaded car.

A given brake pipe signal may be either reduced to effect brake actuation on an unloaded railway car, or increased to effect brake actuation on a loaded railway car. In the former case, a limiting valve may be provided between the control valve and the strut cylinder of the first embodiment of the apparatus to prevent pressure reduction below a predetermined safety level. In the latter case, a limiting valve may be provided across the strut cylinder and the control valve of the second embodiment of the invention to allow, under emergency conditions, the brakes of unloaded railway cars to be actuated to the same degree as the brakes of loaded railway cars. In both cases, the strut cylinder may be adapted to sense the degree of railway car loading, thereby enabling the apparatus to initially effect brake actuation on a partially loaded railway car as though the car were fully loaded, with final actuation effected at a lower value as though the car were unloaded. Also in the latter case, there may be provided an emergency pressure source, if desired.

In a third embodiment of the invention, the diaphragm assembly is directly responsive to fluid actuation by the load sensing strut cylinder. A given brake pipe signal is utilized to effect brake actuation on a loaded railway car, but is reduced to actuate the brakes on an unloaded car. If desired, the strut cylinder of the apparatus can be modified so that brake actuation on a partially loaded car is effected by means of a brake pipe signal relatively greater than that required for an unloaded car. Several variations of strut cylinders which can be utilized with the third embodiment of the invention are disclosed. In most of the strut cylinders disclosed, only brake pipe signals above a predetermined level are proportioned. In one strut cylinder disclosed, all brake pipe signals are proportioned in accordance with the car loading. In addition, the apparatus can be provided with a means for reducing wear of certain of the strut cylinders, if desired.

DESCRIPTION OF THE DRAWINGS

A more complete understanding of the invention may be had by reference to the following Detailed Description when taken in conjunction with the accompanying Drawings, wherein:

FIG. 2 is an enlarged vertical cross-sectional view of a first modification of the strut cylinder of brake control apparatus of FIG. 1;

FIG. 3 is a side view of a railway car undercarriage in which certain parts have been broken away more clearly to illustrate the placement of a load sensing strut cylinder on the bolster;

FIG. 4 is a portion of an end view of a railway car undercarriage taken along the line 4—4 of FIG. 3 and showing a load sensing strut cylinder mounted on a bolster;

FIG. 5 is a vertical cross-sectional view of a brake control apparatus for railway cars incorporating a second embodiment of the invention;

FIG. 6 is an enlarged vertical cross-sectional view of a first modification of the strut cylinder of the brake control apparatus of FIG. 5;

FIG 13 is a partial vertical cross-sectional view of a modification of the strut cylinder of the brake control apparatus of FIG. 7;

FIG. 14 is a partial vertical cross-sectional view of a modification of the strut cylinder of FIG. 13;

FIG. 15 is a partial vertical cross-sectional view of another modification of the strut cylinder of the brake control apparatus of FIG. 7;

FIG. 16 is a partial vertical cross-sectional view of another modification of the strut cylinder of the brake control apparatus of FIG. 7;

FIG. 17 is a partial horizontal cross-sectional view taken along the lines 17—17 of FIG. 16; and FIG. 18 is an operational graph of the brake control apparatus of FIG. 7 incorporating the strut cylinder of FIG. 16.

DETAILED DESCRIPTION OF THE INVENTION

Figure 1:
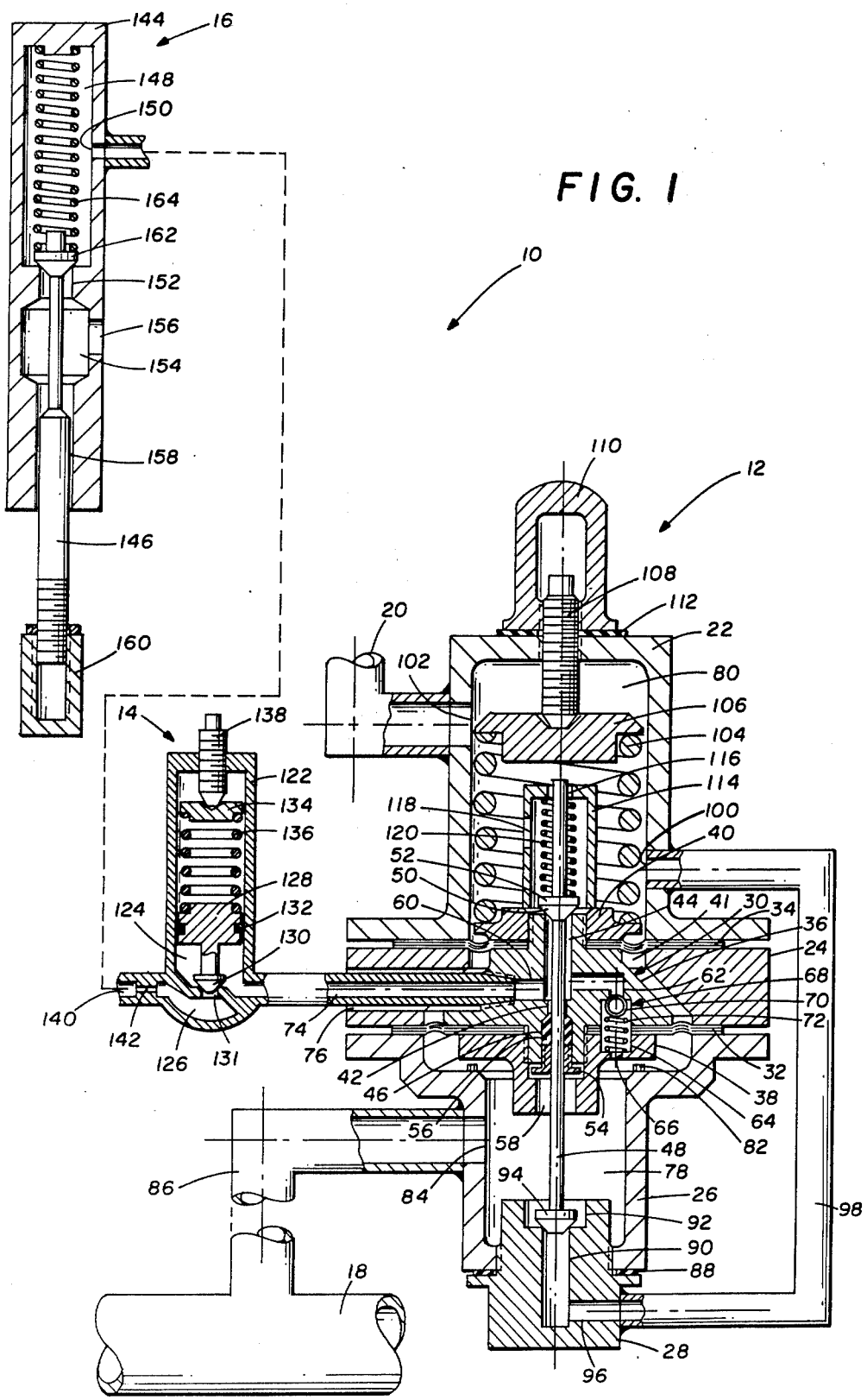
FIG. 1 is a vertical cross-sectional view of a brake control apparatus for railway cars incorporating a first embodiment of the invention.

Referring now to the Drawings, and particularly to FIG. 1 thereof, there is shown a brake control apparatus for railway cars 10 incorporating the first embodiment of the invention. The brake control apparatus 10 comprises a control valve 12, a pressure limiting valve 14 and a strut cylinder 16. Brake control apparatus 10 is interposed between a brake pipe 18 and a brake cylinder line 20. Brake pipe 18 runs along the entire length of the train of railway cars and is connected to a remote source of fluid under pressure (not shown) by means of a brake application valve (not shown). The brake cylinder line 20 serves to connect the brake control apparatus 10 with a conventional brake cylinder (not shown).

Control valve 12 is of sectionalized casing construction, consisting of an upper casing section 22, intermediate casing section 24 and lower casing section 26. Casing sections 22, 24 and 26 are attached one to another. Plug member 28 is threadably engaged through the bottom end of lower casing section 26.

Disposed within the control valve 12 is diaphragm assembly 30. Diaphragm assembly 30 includes a pair of spaced diaphragms, 32 and 34. The outer periphery of the first diaphragm 32 is clamped between the lower face of intermediate casing section 24 and the upper face of lower casing section 26. Similarly, the outer periphery of second diaphragm 34 is clamped between the lower face of upper casing section 22 and the upper face of intermediate casing section 24.

The inner peripheries of diaphragms 32 and 34 are secured within diaphragm assembly 30. The inner periphery of first diaphragm 32 is clamped between the lower face of diaphragm follower 36 and the upper face of lower diaphragm nut 38, which threadably engages a downwardly protruding threaded portion of diaphragm follower 36. In a similar manner, the upper face of diaphragm follower 36 includes an upwardly protruding threaded portion on which is threadably engaged upper diaphragm nut 40. Hence, the inner periphery of second diaphragm 34 is securely clamped between the lower face of upper diaphragm nut 40 and the upper face of diaphragm follower 36. Thus it is seen that diaphragms 32 and 34 flexibly suspend diaphragm assembly 30 for limited axial translation within the sloped annular space 41 between diaphragm assembly 30 and intermediate casing section 24.

Diaphragm follower 36 includes a bore 42 positioned coaxially intermediate upper counterbore 44 and lower counterbore 46. Slidably disposed within bore 42, and extending through counterbores 44 and 46, is valve stem 48. Upper counterbore 44 extends upwardly from bore 42 and terminates in a valve seat 50 located in the end surface of the upper threaded protrusion of diaphragm follower 36. Valve seat 50 serves to receive valve member 52, which is rigidly secured to valve stem 48 at a point below the upper end thereof. Lower counterbore 46 extends downwardly from bore 42, terminating at the end of the lower threaded protrusion of diaphragm follower 36. A packing nut 54, through which valve stem 48 is slidably received, threadably engages the outer portion of lower counterbore 46 to compress and retain packing material 56 therein. As a means of preventing undesirable pressure losses due to accidental displacement of packing material 56 caused by the disengagement of packing nut 54 during service, lower diaphragm nut 38 includes a coaxial bore 58 having an inside diameter less than the outside diameter of the collar of packing nut 54. As a result, lower diaphragm nut 38 serves both to retain packing nut 54 and to prevent its complete disengagement from counterbore 46. Therefore, it will be seen that valve stem 48, which is slidably disposed in bore 42 as well as packing nut 54, extends completely through diaphragm assembly 30.

Also included in diaphragm follower 36 of diaphragm assembly 30 are left and right cross bores, 60 and 62, respectively, both of which open into counterbore 44 at their interior ends. Right cross bore 62 serves to communicate upper counterbore 44 with a cavity 64 formed between diaphragm follower 36, first diaphragm 32 and lower diaphragm nut 38. Port 66 connects cavity 64 in turn through the outer surface of lower diaphragm nut 38. A check valve 68 comprising a spherical member 70 biased against the entrance of right cross bore 62 onto cavity 64 by spring 72 functions to close off cavity 64 from upper counterbore 44 under certain conditions. Left cross bore 60, on the other hand, unites upper counterbore 44 with conduit 74, one end of which is secured to diaphragm follower 36. The other end of conduit 74 leads to limiting valve 14 through an opening 76 in intermediate casing section 24 of control valve 12. Opening 76 is sufficiently large to permit translative movement of conduit 74 simultaneously with movable diaphragm assembly 30, to which it is attached.

Still having reference to FIG. 1, diaphragm assembly 30, by virtue of its position within control valve 12, separates the interior volume thereof into two chambers, 78 and 80. Pressure supply chamber 78 is defined by the lower surface of diaphragm assembly 30, in conjunction with lower casing section 26 and plug member 28. The effective area of diaphragm assembly 30 abutting pressure supply chamber 78 is thus the area across the enlarged mouth of lower casing section 26. Stops 82 are provided around the horizontal rim of lower casing section 26 to limit downward displacement of diaphragm assembly 30, as well as to prevent pressure tight engagement between lower diaphragm nut 38 and the inner rim of lower casing section 26. A port 84 within the wall of lower casing section 26 opens into a conduit 86 which connects with brake pipe 18. Consequently, fluid communication is directly established between pressure supply chamber 78 and brake pipe 18.

Located at the bottom end of pressure supply chamber 78 plug member 28 is threadably engaged through the end of lower casing section 26. An annular gasket 88 is provided for clamping, sealing engagement between the exterior end of lower casing section 26 and the collar of plug member 28 to preclude leakage of fluid under pressure from chamber 78 to atmosphere.

Plug member 28 includes substantially centrally located bore 90 and coaxial counterbore 92, whose intersection forms a valve seat to receive valve member 94. Extending downward from its slidable connection in diaphragm assembly 30 is valve stem 48, the end of which is attached to the valve member 94 that seats in plug member 28. Bore 90 connects counterbore 92 opening into pressure supply chamber 78 with one end of cross bore 96. The other end of cross bore 96 leads to conduit 98 which is attached to a bore 100 positioned in upper casing section 22. Accordingly, it will be appreciated that fluid communication may be established via conduit 98 between pressure supply chamber 78 and control chamber 80 subject to the action of valve 94.

Control chamber 80 is defined as that volume existing between the end of upper casing section 22 and the movable abutment formed by the top end of diaphragm assembly 30. It will be noted that the effective area of the upper end of diaphragm assembly 30 abutting control chamber 80 is less than the effective area of the lower end of diaphragm assembly 30 abutting pressure supply chamber 78. Port 102 located in the wall of upper casing section 22 allows for direct fluid communication between control chamber 80 and a brake cylinder (not shown) via brake line 20. Coil spring 104 is disposed within control chamber 80 intermediate upper diaphragm nut 40 and spring follower 106. The spring follower 106 has a depression in its upper surface for receiving and centering spring adjusting screw 108, which is threadably mounted substantially centrally through the upper casing section 22. Thus, by means of spring adjusting screw 108, the downward biasing force of spring 104 against diaphragm assembly 30 may be set to a predetermined value and/or adjusted from the outside of control valve 12 without disassembly thereof. A protective jam nut 110 threadably engages the exterior protruding end of spring adjusting screw 108 to lock it in any desired position. Gasket 112, placed between jam nut 110 and the exterior of upper casing section 22, forms a seal to prevent leakage of fluid pressure from control chamber 80 to atmosphere.

Disposed within coil spring 104 and attached to the top surface of upper diaphragm nut 40 is guide 114. Aperture 116 in the top end of guide 114 serves to receive and guide the uppermost portion of valve stem 48. Control chamber 80 fluidly communicates with the interior of guide 114 through port 118. A spring 120, disposed in surrounding relationship to valve stem 48 between valve member 52 and the inside end of guide 114, biases valve stem 48 downward relative to diaphragm assembly 30. As a consequence, fluid communication may be established between control chamber 80 and upper counterbore 44 in diaphragm assembly 30 subject to the action of valve 52.

Pressure limiting valve 14 includes a body 122 having a first chamber 124 and a second chamber 126. Slidably disposed within first chamber 124 is a piston 128, from the bottom face of which extends a valve member 130. Valve 130 serves to open or close passage 131 joining chambers 124 and 126. First chamber 124 connects to a passageway defined by conduit 74, which leads to cross bore 60 in a diaphragm assembly 30.

Piston 128, slidably positioned within first chamber 124, has a peripheral annular groove in which is disposed an O-ring 132. O-ring 132 forms a sliding seal between piston 128 and the interior surface of body 122 so as to prevent leakage of fluid pressure from the lower portion of first chamber 124 to the upper portion thereof. Positioned in the upper portion of first chamber 124, intermediate the top of piston 128 and spring follower 134, is spring 136. Spring 136 is biased to counteract the force generated by the pressure in the lower portion of first chamber 124 acting against the bottom face of piston 128. The force exerted by spring 136 may be preset or adjusted by means of spring adjusting screw 138. Spring adjusting screw 138 is threadably mounted through the top end of body 122 and contacts spring follower 134. Consequently, it will be understood that conduit 74 may fluidly communicate through first chamber 124 and passage 131 with second chamber 126 subject to the action of valve 130.

Second chamber 126 opens to a passageway 140 via choke 142, which functions to restrict the rate of fluid flow between passageway 140 and second chamber 126. The other end of passageway 140 leads to strut cylinder 16.

Strut cylinder 16 includes a body 144 in which is disposed an extending strut 146. Body 144 includes a top chamber 148. A port 150 in the wall of body 144 connects top chamber 148 with passageway 140. Therefore, top chamber 148 of strut cylinder 16 is in fluid communication with second chamber 126 of pressure limiting valve 14. Bore 152 joins top chamber 148 with bottom chamber 154, which opens to atmosphere via port 156. Lower bore 158, which is coaxial with bore 152, slidably engages and guides strut 146 for translation within body 144. The bottom end of strut 146 is reduced and threaded to receive a contact nut 160. A valve body 162 is located in top chamber 148 and is attached near the reduced top end of strut 146. A spring 164 interposed between the end of top chamber 148 and valve body 162 urges strut 146 downwardly, which moves valve 162 to a closed position. Preferably, contact nut 160 should be adjusted so that valve 162 is open when the car is loaded at between 40% and 60% capacity. Accordingly, subject to the position of valve 162, passageway 140 may be either closed or open to chambers 148 and 154, and thus to atmosphere.

Turning momentarily to FIGS. 3 and 4 in conjunction with FIG. 1, there is shown a typical location for a strut cylinder 181 which may be similar to strut cylinder 16. Railway car 166 is supported atop an undercarriage 168. Undercarriage 168 comprises a transverse truck bolster 170 which supports side truck frames 172. Side truck frames 172 are resiliently attached to truck bolster 170 by means of springs 174. Rotatably supported on side truck frames 172 are wheels 176, which rollingly contact underlying railroad track 178. Strut cylinder 181 is mounted substantially vertically on truck bolster 170, as for instance with bracket 180. Projecting stop 182 secured to truck side frame 172 extends substantially horizontally beneath the strut cylinder 181. The strut cylinder 181 is thus mounted on a sprung portion of the undercarriage 168 while its stop 182 is mounted on an unsprung portion of the undercarriage 168. Since various loadings in railway car 166 cause corresponding deflections in spring 174 and hence relative displacement between sprung and unsprung portions of undercarriage 168, the condition of loading is sensed by strut cylinder 181.

The parts of the brake control apparatus 10 illustrated in FIG. 1 and so far described function as follows. Prior to charging the train brake system for operation, it will be understood that all cavities and conduits within brake control apparatus 10 are at or near zero gauge pressure. With no pressure in pressure supply chamber 78 to counteract the downward force of spring 104, diaphragm assembly 30 rests in a down position against stops 82. Diaphragm assembly 30 thus displaced downward, valve 94 is closed while valve 52 is open to permit fluid communication from upper counterbore 44 through guide 114 and port 118 to control chamber 80.

In initially charging the automatic brake control apparatus 10, a remote source of fluid under pressure (not shown) supplies pressurized fluid to brake pipe 18. Pressurized fluid flows from brake pipe 18 through conduit 86 to supply chamber 78 of control valve 12. As the pressure builds within supply chamber 78, the resultant upward force on diaphragm assembly 30 overcomes the opposing force of spring 104, moving diaphragm assembly 30 upward. The upward shift of diaphragm assembly 30 causes valve seat 50 to engage valve 52, thereby closing communication between upper counterbore 44 and brake control chamber 80. Further pressure rise in supply chamber 78 pushes diaphragm assembly 30 and thus valve stem 48 upward beyond the generally central position where valve 52 was closed. Since valves 94 and 52 are both rigidly fixed to valve stem 48, valve 94 is therefore pulled open allowing pressurized fluid to enter control chamber 80 from supply chamber 78 via conduit 98. As this pressurized fluid fills control chamber 80, a downward force is generated to augment the biasing of spring 104. Diaphragm assembly 30 will thus shift to a generally central position where the sum of the forces acting downwardly on diaphragm assembly 30 are precisely balanced by the forces acting upwardly on diaphragm assembly 30. That is, in the balanced position depicted in FIG. 1, the upward force generated by the pressure in supply chamber 78 against the lower face of diaphragm assembly 30 cancels the sum of the force of spring 104 and the force generated by the pressure in control chamber 80 against the upper face of diaphragm assembly 30. Therefore, only brake line 20, conduits 86 and 98, and chambers 78 and 80 are initially charged to the pressure level of brake pipe 18. FIG. 1 depicts brake control apparatus 10 in a charged and ready condition.

When it is desired to set the brakes on an unloaded railway car, fluid pressure in brake pipe 18 is reduced in the usual manner (typically a staged reduction) by operation of a remote brake valve. The same given pressure drop signal in brake pipe 18 occurs in pressure supply chamber 78 which is joined thereto by conduit 86. This drop in pressure in chamber 78 of control valve 12 upsets the force balance on diaphragm assembly 30, which consequently shifts downward from its generally central position as it seeks to regain a position of equilibrium. As diaphragm assembly 30 shifts downward, it simultaneously translates along the axis of valve stem 48. Valve stem 48 remains stationary as diaphragm assembly 30 slides downwardly therealong because valve 94, which is rigidly attached to valve stem 48, remains firmly seated in plug member 28. However, the downward shift of diaphragm assembly 30 causes disengagement of valve seat 50 from valve 52. Thus, valve 52 opens in opposition to the biasing force of spring 120 which normally urges valve 52 into seating engagement within diaphragm assembly 30.

Since valve 52 is now open, fluid communication exists between counterbore 44 and control chamber 80 through port 118 of guide 114. Hence, the pressure of control chamber 80, which at this time is higher than the pressure in supply chamber 78 after a given pressure drop signal, is present in counterbore 44 as well as cross bores 60 and 62, and conduit 74. Fluid at the pressure of control chamber 80 thus enters chamber 124 of limiting valve 14. Valve 130 is normally held open by the pressure of control chamber 80 acting on the bottom face of piston 128 against the yielding resistance of spring 136.

It is pointed out that valve 130 closes passage 131 only when the pressure in chamber 124 of limiting valve 14 drops to a level which is insufficient to resist the downward force of spring 136. In view of the fact that spring 136 may be preset to a desired compression force by means of adjusting screw 138, it will be understood that valve 14 functions as a safety valve by closing passage 131 when the pressure in control chamber 80 drops below a predetermined level. In other words, limiting valve 14 serves as a safety valve for pressure coming down as opposed to pressure going up. It will also be understood that limiting valve 14 is not essential to the basic operation of brake control apparatus 10. The presence of limiting valve 14 merely adds a desirable safety feature.

Assuming, however, that valve 130 and passageway 131 are open, pressurized fluid flows from chamber 124 into chamber 126 and through passageway 140 to chamber 148 of strut cylinder 16. Since the railway car is unloaded, there is no contact between the end of strut 146 and projecting stop 182 which would unseat valve 162. Other than being pressurized to a level corresponding with the pressure in control chamber 80, and given the fact that chamber 148 is closed at the end of passageway 140, no fluid flows through limiting valve 14 to or through strut cylinder 16. It will be noted that pressure loss due to excessive volume of conduits and chambers are negligible in brake control apparatus 10 when limiting valve 14 and strut cylinder 16 are mounted in close proximity to control valve 12 in accordance with the preferred embodiment of the invention.

Also opening into counterbore 44 of control valve 12 is right cross bore 62, which also senses the pressure of control chamber 80. Check valve 68 separates the other end of cross bore 62 from port 66 opening onto supply chamber 78. With two unequal pressures acting upon spherical member 70 of check valve 68, the greater pressure of control chamber 80 prevails to unseat spherical member 70 against the yielding resistance of retaining spring 72. As a result, fluid passes from control chamber 80 through port 118, past open valve 52, through bores 44 and 62, around open valve 68 and into supply chamber 78. In this manner, the pressure drops and the pressures in chambers 78 and 80 are equalized. Without a pressure differential to hold valve 68 open, spring 72 closes valve 68 to cut off communication between chambers 78 and 80. Therefore, the brakes on an unloaded railway car are actuated by the identical pressure drop signal through brake line 20 as occurred in brake pipe 18.

When it is desired to release the brakes of an unloaded railway car, operation of the brake valve brings the pressure in brake pipe 18 back up to the prebrake application level. The increased pressure in the supply chamber 78 again creates a force imbalance on diaphragm assembly 30 since the pressure in control chamber 80 is now lower than that in supply chamber 78. Check valve 68 is closed and no other fluid communication exists at this moment between chambers 78 and 80. The greater pressure in supply chamber 78 forces diaphragm assembly 30 upward against the yielding resistance of spring 104 and past the generally central position illustrated in FIG. 1 where valve seat 50 is brought into contact with valve 52. Valve 52 is thus engaged and pushed upward as is valve stem 48. This upward displacement by diaphragm assembly 30 unseats valve 94, whereby fluid at a greater pressure may pass from supply chamber 78 through bores 92, 90 and 96, and conduit 98 into control chamber 80. Consequently, pressure in control chamber 80 and brake line 20 rises to effect brake release and to move diaphragm assembly 30 back to a position of equilibrium where valves 52 and 94 are closed. Thus, it will be seen that chambers 78 and 80 are once again charged at equal pressures and that brake control apparatus 10 is ready for the next brake application on an unloaded railway car.

When it is desired to set the brakes on a loaded railway car with brake control apparatus 10 shown in FIG. 1, the fluid pressure in brake pipe 18 is reduced in the usual manner (typically a staged reduction) by operation of the brake valve. The same given pressure drop signal in brake pipe 18 occurs in conduit 86 and supply chamber 78. This drop in pressure in chamber 78 of control valve 12 changes the force balance on diaphragm assembly 30, which consequently shifts downward from its generally central position as it seeks to regain a position of equilibrium. As diaphragm assembly 30 shifts downward, it simultaneously translates along the axis of valve stem 48. Valve stem 48 remains stationary as diaphragm assembly 30 slides downwardly therealong because valve 94, which is rigidly attached to valve stem 48, remains firmly seated in plug member 28. However, the downward shift of diaphragm assembly 30 causes disengagement of valve seat 50 from valve 52. Thus, valve 52 opens in opposition to the biasing force of spring 120, which normally urges valve 52 into seating engagement within diaphragm assembly 30.

Since valve 52 is now open, fluid communication exists between counterbore 44 and chamber 80 through port 118 of guide 114. Hence, the pressure of control chamber 80, which at this moment is higher than the pressure in supply chamber 78 after a given pressure drop signal, is present in counterbore 44, as well as in cross bores 60 and 62, and conduit 74. Fluid at the pressure of control chamber 80 thus enters chamber 124 of limiting valve 14. With the assumption that there are no breakages or leaks in brake line 20 downstream of control chamber 80, the pressure of chamber 80 acting against the lower face of piston 128 in opposition to spring 136 holds valve 130 away from its valve seat in a disengaged position. Passageway 131 being open, fluid flows from chamber 124 into chamber 126 and through passageway 140 to chamber 148 of strut cylinder 16. Since the railway car is loaded the sprung and unsprung portions of undercarriage 168 shown in FIGS. 3 and 4 have assumed a closer relative position whereby strut cylinder 16 is brought into contact with projecting stop 182. Consequently, strut 146 occupies a slidable position whereby valve 162 is now unseated. Pressurized fluid may thus flow from chamber 148 through bore 152 into chamber 154 and out port 156 to atmosphere. Therefore, fluid at the pressure of control chamber 80 may effectively vent to atmosphere by flowing from chamber 80 past open valve 52 through counterbore 44, cross bore 60, conduit 74, limiting valve 14, choke 142, passageway 140, and strut cylinder 16.

As the pressurized fluid in control chamber 80 vents to atmosphere, the pressure in chamber 80 drops rapidly to a level below that of supply chamber 78. It is pointed out that since the pressure of supply chamber 78 exceeds that of control chamber 80, pressure of chamber 78 in conjunction with the force of retaining spring 72 holds check valve 68 closed against the lower pressure of chamber 80, whereby a pressure dump through cross bore 62, counterbore 44, cross bore 60, and conduit 74 to atmosphere is precluded. Consequently, with a constant pressure existing in supply chamber 78 after the given pressure drop signal in brake pipe 18, and with the pressure dropping in control chamber 80, diaphragm assembly 30 seeks a position of equilibrium. Equilibrium is achieved when the upward force generated by the pressure of supply chamber 78 applied to the lower face of diaphragm assembly 30 balances the downward sum of the force of spring 104 and the force generated by the pressure of control chamber 80 applied to the upper face of diaphragm assembly 30. Since the downward force of spring 104 is constant and the force generated by a pressure is directly proportional to the area over which that pressure is applied, a given pressure drop over a larger area must be balanced by a greater pressure drop over a smaller area. For example, if the ratio of the areas of diaphragm assembly 30 abutting chambers 80 and 78 were 1:2, a pressure drop of two (2) psi in chamber 78 would be equalized by a four (4) psi pressure drop in chamber 80 in conjunction with a constant spring force. It will be understood that the end areas of movable diaphragm assembly 30 abutting chambers 78 and 80 may be selectively sized to produce the desired relative pressure drops between said chambers.

Diaphragm assembly 30 thus moves upward toward a generally central position to close valve 52, thereby halting the decrease of pressure in chamber 80. Note that the pressure in control chamber 80 is prevented from falling below a desired safety level by limiting valve 14 because, the counteracting pressure rendering insufficient opposition, adjustable spring 136 would urge valve 130 to close off communication with atmosphere. Therefore, the pressure drop signal actuating the brakes of a loaded railway car through brake line 20 is larger than that which occurred in brake pipe 18 by the inverse ratio of the areas of diaphragm assembly 30 abutting chambers 80 and 78 respectively.

The brakes on a loaded railway car are released in the same manner as are the brakes of an unloaded railway car. Briefly, operation of a remote brake valve (not shown) brings the pressure in brake pipe 18 up to the prebrake application level, which consequent pressure increase in supply chamber 78 forces diaphragm assembly 30 upward against the yielding resistance of spring 104 and the relatively lower pressure of control chamber 80. The upward displacement of diaphragm assembly 30 pulls valve stem 48 upward, unseating valve 94, whereby fluid at greater pressure may pass from supply chamber 78 through bores 92, 90 and 96 and conduit 98 into control chamber 80. Pressure in control chamber 80 and brake line 20 thus rises to effect brake release and to cause diaphragm assembly 30 to move back to a generally central position of equilibrium where valves 94 and 52 are closed. Chambers 78 and 80 being charged to the same pressure, brake control apparatus 10 is ready for the next brake application on a laden railway car.

Referring now to FIG. 2, there is shown a modification of a strut cylinder 16 which may be used with loaded, unloaded or partially loaded railway cars. FIG. 2 shows a strut cylinder 200, which includes a body 202 having an upper chamber 204, a central chamber 206 and a lower chamber 208. A port 210 in the wall of upper chamber 204 unites with conduit 212, which connects to brake line 20 by means of a tee connection (not shown). Fluid communication is consequently established between brake line 20 and chamber 204. A port 214 is also provided in the wall of central chamber 206. Port 214 connects central chamber 206 with passageway 140 leading to second chamber 126 of limiting valve 14. Lower chamber 208 is constantly open to atmosphere via port 215.

Disposed within strut cylinder 200 and extending through chambers 204, 206 and 208 is valve stem assembly 216, comprising valve stem 218 and strut 220. Piston 222, secured to the upper end of valve stem 218, is slidably disposed within chamber 204. Piston 222 includes a peripheral annular groove having disposed therein O-ring 224. O-ring 224 forms a sliding seal between piston 222 and the interior surface of chamber 204 to confine pressurized fluid beneath the lower face of piston 222. Spring 226 is disposed within the upper portion of chamber 204, between the upper face of the piston 222 and spring follower 228. The spring follower 228 has a depression in its upper surface for receiving and centering spring adjusting screw 230, which is threadably mounted substantially centrally through the top end of body 202. Thus, by means of spring adjusting screw 230, the downward biasing force of spring 226 against valve stem 218 may be set to a predetermined value and/or adjusted from the outside of strut cylinder 200 without any disassembly thereof.

A jam nut 232 threadably engages the exterior end of body 202 to cover and protect the protruding end of spring adjusting screw 230. A lock washer 234 is placed between jam nut 232 and the top end of the body 202 to further secure jam nut 232 under conditions of high vibration typically encountered during railway operations.

Valve stem 218 extends downwardly from piston 222 through bore 236, chamber 206 and bore 238 into chamber 208. Bores 236 and 238 are coaxially oriented. O-ring 240, disposed within a peripheral annular groove in bore 236, forms a sliding seal with valve stem 218 thereby preventing fluid communication between the chambers 204 and 206. Valve body 242, intermediately mounted on valve stem 218 within central chamber 206, seats in bore 238 located in the bottom of chamber 206. The position of valve 242 functions to open or close fluid communication between chambers 206 and 208 under certain conditions.

The bottom end of valve stem 218 couples to the upper end of strut 220 within chamber 208. The connection between valve stem 218 and strut 220 is of the lost motion type, such as pin and slot arrangement 244. Spring follower 246 is secured near the upper end of strut 220. Another spring follower 248 is mounted near the lower end of valve stem 218. Placed between spring followers 246 and 248, spring 250 surrounds the connecting ends of valve stem 218 and strut 220. Consequently, valve stem 218 and strut 220 are telescopingly connected with pin and slot arrangement 244 and biased apart by spring 250.

The remaining portion of strut 220 slidably extends through a coaxial bore 252 located in the lower end of body 202. Contact nut 254 engages the reduced and threaded end of strut 220. Accordingly, subject to the amount of extension of strut 220, and thus the position of valve 242, passageway 140 may be either open or closed to atmosphere through chamber 208.

Having reference momentarily to FIGS. 3 and 4 in conjunction with FIG. 2, there is shown a typical location for a strut cylinder 181 which may be similar to strut cylinder 200. Strut cylinder 200 senses the condition of railway car loading in a manner generally analogous to that described hereinbefore. Briefly, strut cylinder 181 is mounted substantially vertically on truck bolster 170, which is a sprung portion of railway undercarriage 168. Stop 182, secured to truck side frame 172, an unsprung portion of the undercarriage, projects substantially horizontally beneath the strut of strut cylinder 181. Therefore, strut cylinder 181 senses the condition of loading in railway car 166 as a function of the relative displacement between the sprung and unsprung portions of railway undercarriage 168.

When mounted on the railway car undercarriage, strut cylinder 200 is adjusted for operation as follows. Depending upon the setting of contact nut 254, the inward translation of strut 220 causes increased compression within spring 250 tending to open valve 242. The counteracting force of spring 226 is then set by means of adjusting screw 230 so that valve 242 is closed. Thus the position of valve 242 is a function of the interaction of springs 226 and 250, and the pressure within control chamber 80.

The parts of brake control apparatus 10 when strut cylinder 200 rather than strut cylinder 16 is employed as cylinder 181 in FIGS. 3 and 4, function as follows. It will be understood that brake control apparatus 10 incorporating the first modification shown in FIG. 2 functions exactly as was previously described both prior to charging and during charging of the train brake system for operation. FIG. 1 depicts control valve 12 and limiting valve 14 in a charged and ready condition.

The brake set sequence on an unloaded railway car is substantially identical to that which was described above. Briefly, operation of the remote brake valve drops the pressure in brake pipe 18 as well as in supply chamber 78. This drop in pressure in chamber 78 of control valve 12 allows diaphragm assembly 30 to shift downward from its generally central position along the axis of valve stem 48. The downward displacement of diaphragm assembly 30 unseats valve 52, allowing pressurized fluid at a higher pressure from control chamber 80 to enter counterbore 44, cross bores 60 and 62, and conduit 74. However, since the railway car is unloaded, there is no interaction between the end of strut 220 and projecting stop 182 shown in FIGS. 3 and 4 which would unseat valve 242 in strut cylinder 200. Consequently, no pressurized fluid flows through conduit 74, limiting valve 14, passageway 140 or strut cylinder 200 as this pressure discharge route is blocked.

With two unequal pressures acting upon check valve 68, the greater pressure of control chamber 80 prevails to unseat spherical member 70 thereof. Fluid then passes from control chamber 80 through port 118 and past open valves 52 and 68 and into supply chamber 78. In this manner, the pressure differential, and hence the pressures, in chambers 78 and 80 equalize as diaphragm assembly 30 resumes its central position in which valves 52 and 68 are closed.

Since conduit 212 connects chamber 204 of strut cylinder 200 with the brake line 20, chamber 204 experiences a pressure identical to the pressure in chambers 78 and 80 of control valve 12. It will be understood that the downward biasing force of spring 226 was preset to hold valve 242 closed against the upward force generated by the pressure of chamber 204 exerted over the bottom face of piston 222. Therefore, the brakes on an unloaded railway car are actuated by the identical pressure drop signal through brake line 20 as occurred in brake pipe 18.

Setting the brakes on a loaded railway car with a brake control apparatus 10 incorporating strut cylinder 200 also proceeds as was described before. Operation of the brake valve causes a given pressure drop signal in brake pipe 18 as well as supply chamber 78. As a consequence, diaphragm assembly 30 shifts downward from its generally central position seeking to regain a position of equilibrium. The downward displacement of diaphragm assembly 30 unseats valve 52, while valve 94 remains firmly seated. With valve 52 open, fluid at high pressure from control chamber 80 enters bore 44 and passes through conduit 74, limiting valve 14, and passageway 140 into central chamber 206 of strut cylinder 220.

Since railway car 166 is now loaded, the sprung and unsprung portions of undercarriage 168 occupy a closer relative position whereby projecting stop 182 has pushed strut 220 into strut cylinder 200 causing increased compression within spring 250 tending to push valve stem 218 upward, which in turn compresses spring 226. With valve stem 218 and strut 220 thus relatively closer, valve stem assembly 216 occupies a position wherein valve 242 is unseated. Hence, pressurized fluid may flow through passageway 140 past open valve 242 and out port 215 to atmosphere. Therefore, fluid at the pressure of control chamber 80 may effectively vent to atmosphere by flowing from control chamber 80 past open valve 52 through conduit 74, limiting valve 14, passageway 140 and strut cylinder 200.

It will be understood that chamber 204 of strut cylinder 200 experiences the pressure of control chamber 80 through conduit 212 connected to brake line 20. Hence, the pressure in chamber 204 is decreasing and thus rendering less opposition to spring 226. Consequently, valve 242 stays open so long as spring 250 together with the pressure in chamber 204 overcomes spring 226.

As it vents to atmosphere, the pressure in control chamber 80 drops rapidly to a level below that of supply chamber 78. Check valve 68 remains closed as a consequence. Since the force generated by a given pressure drop over a larger area neutralizes the force generated by a greater pressure drop over a smaller area, diaphragm assembly 30 thus moves toward a generally central position to halt the decrease of pressure in chamber 80 by closing valve 52. Note that the pressure in control chamber 80 is prevented from falling below a desired safety level by limiting valve 14, as discussed previously. Therefore, the pressure drop signal actuating the brakes of a fully laden railway car through brake line 20 is larger than that which occurred in brake pipe 18 by the inverse ratio of the areas of diaphragm assembly 30 abutting chambers 80 and 78, respectively.

The primary advantage in using strut cylinder 200 with brake control apparatus 10 is realized when applying brakes to a partially loaded railway car. As usual, operation of the brake valve causes a given pressure drop signal to occur in brake pipe 18 and supply chamber 78. With less pressure now in supply chamber 78, diaphragm assembly 30 shifts downward from its former position of equilibrium, unseating valve 52, while valve 94 remains firmly closed. Pressurized fluid at the still higher pressure of control chamber 80 is allowed to pass open valve 52 into bore 44 and through conduit 74, limiting valve 14 and passageway 140, into chamber 206 of strut cylinder 200. Chamber 204 of strut cylinder 200 is constantly open to brake line 20 via conduit 212, thus both chambers 204 and 206 of strut cylinder 200 are in fluid communication with chamber 80 of control valve 12.

Since the railway car is only partially loaded, stop 182 pushes strut 220 into body 202 a relatively lesser distance causing increased compression of spring 250 tending to push valve stem 218 upward. Consequently, strut 220 and valve stem 218 assume closer relative positions whereby spring 226 is compressed. The resultant compression of spring 250 exerts an upward force on valve stem 218 which lifts valve 242 from its seat. Accordingly, the pressure in control chamber 80 drops as it vents to atmosphere through passageway 140, bore 238, chamber 208 and port 215 to an initial level corresponding to a loaded railway car. Since chambers 204 and 80 are in fluid communication, pressure simultaneously decreases in chamber 204 resulting in a corresponding decreasing force component in opposition to spring 226. Thus, the decreased pressure within control chamber 80 eventually renders spring 226 effective to move valve 242 toward a closed position, as if the railway car were unloaded. Were the pressure in control chamber 80 to drop to a predetermined safety level, limiting valve 14 would function as previously described to prevent any further pressure loss. Therefore, the pressure drop signal actuating the brakes of a partially loaded railway car through brake line 20 is initially the brake signal corresponding to a loaded car and finally the relatively smaller brake signal corresponding to an unloaded car. It will be understood that the brake signal response depends upon the degree of partial railway car loading.

The ability of strut cylinder 200 to tailor the braking signal in relation to the extent of railway car loading comprises a significant feature. It is again pointed out that strut cylinder 200 may be scheduled in two ways. First, with spring adjusting screw 230, spring 226 may be preset to close valve 242 when the pressure in control chamber 80 drops to a predetermined level. Second, by means of contact nut 254, the point of engagement with projecting stop 182 may be preset to compensate for the differing empty weights of various type railway cars.

The release of the brakes on a loaded, unloaded or partially loaded railway car proceeds exactly as was described above. Briefly, operation of the remote brake valve brings up the pressure in brake pipe 18 and supply chamber 78, which forces diaphragm assembly 30 upward to unseat valve 94 while holding valve 52 closed. Fluid is thus allowed to enter chamber 80 through conduit 98 until chambers 78 and 80 equalize and valves 94 and 52 are closed in anticipation of the next brake application.

Turning now to FIG. 5, there is shown a brake control apparatus 300 incorporating a second embodiment of the invention. Brake control apparatus 300 comprises a control valve 302, a pressure limiting valve 304 and a strut cylinder 306. Brake control apparatus 300 is interposed between a brake pipe 18 and a brake line 20. Brake pipe 18 runs along the entire train length of railway cars and is connected to a remote source of fluid under pressure (not shown) by means of a brake application valve (not shown). The brake line 20 connects brake control apparatus 300 with a conventional brake cylinder (not shown).

Control valve 302 is of sectionalized casing construction, consisting of an upper casing section 308, an intermediate casing section 310 and a lower casing section 312. Casing sections 308, 310 and 312 are secured together. Plug member 314 is threadably engaged through the top end of upper casing section 308.

Disposed within control valve 302 is diaphragm assembly 316. Diaphragm assembly 316 includes a spaced pair of diaphragms 318 and 320. The outer periphery of first diaphragm 318 is clamped between the lower face of intermediate casing section 310 and the upper face of lower casing section 312. Similarly, the outer periphery of second diaphragm 320 is clamped between the lower face of upper casing section 308 and the upper face of intermediate casing section 310.

The inner peripheries of diaphragms 318 and 320 are secured within diaphragm assembly 316. The inner periphery of first diaphragm 318 is clamped between the lower face of diaphragm follower 322 and the upper face of lower diaphragm nut 324, which threadably engages a downwardly protruding threaded portion of diaphragm follower 322. In a similar manner, the upper face of diaphragm follower 322 includes an upwardly protruding threaded portion threadably engaged by upper diaphragm nut 326 to securely clamp the inner periphery of second diaphragm 320 therebetween. Thus, it will be seen that diaphragms 318 and 320 flexibly suspend diaphragm assembly 316 for limited axial translation within the sloped annular space 325 between diaphragm assembly 316 and intermediate casing section 310.

Diaphragm follower 322 includes coaxial bore 328. Bore 328 extends through diaphragm follower 322, between the protruding end portions thereof. The top end of bore 328 unites with counterbore 330 of upper diaphragm nut 326. Diaphragm nut 326 further includes bore 332 positioned intermediate first counterbore 330 and second counterbore 334. Consequently, there is a passage through diaphragm assembly 316 made up of coaxial bores and counterbores.

By virtue of its placement within control valve 302, diaphragm assembly 316 separates the interior volume thereof into two chambers, 336 and 338. Pressure supply chamber 336 is defined as that volume between the lower surface of diaphragm assembly 316, and casing section 312. The effective area of diaphragm assembly 316 abutting pressure supply chamber 336 is thus the area across the mouth of casing section 312. Coil spring 340 is disposed within chamber 336 intermediate lower diaphragm nut 324 and spring follower 342. The spring follower 342 has a depression in its bottom surface for receiving and centering spring adjusting screw 344, which is threadably mounted substantially centrally through lower casing section 312. Thus, by means of spring adjusting screw 344, the upward spring bias against diaphragm assembly 316 may be set to a predetermined value and/or adjusted from the outside of control valve 302 without disassembly thereof. A protective jam nut 346 threadably engages the exterior protruding end of spring adjusting screw 344 to lock it in any desired position. Gasket 348, placed between jam nut 346 and the exterior of casing section 312, forms a seal to prevent pressure leakage from supply chamber 336. Located in the wall of lower casing section 312, port 350 connects supply chamber 336 with conduit 352, leading to brake pipe 18. Consequently, fluid communication exists between pressure supply chamber 336 and brake pipe 18.

On the other side of diaphragm assembly 316, control chamber 338 is defined by the upper surface of diaphragm assembly 316, in conjunction with upper casing section 308 and plug member 314. It is pointed out that the effective area of the upper end of diaphragm assembly 316 abutting control chamber 338, due to the enlarged mouth of casing section 308, exceeds the effective area of the other end of diaphragm assembly 316 which abuts supply chamber 336. Port 354 located in the wall of casing section 308 provides direct fluid communication between control chamber 338 and a brake cylinder (not shown) by means of brake line 20.

Plug member 314 includes a bore 356 positioned between and coaxial with counterbores 358 and 360. Upper counterbore 358 includes a port 362, to which is connected conduit 364 leading to pressure accumulator 366. Line 368, connected between conduit 364 and brake line 20, includes a check valve 370, which in its simplest form may consist of a spherical valve member confined by a transverse pin and a choked passageway in line 368.

Valve assembly 372 is disposed within control chamber 338 between plug member 314 and upper diaphragm nut 326. Valve assembly 372 includes a valve stem 374. The lower end of valve stem 374 has a rigid valve body 376 which seats on bore 332 in diaphragm nut 326. The upper end of valve stem 374 is flexibly coupled to valve body 378 to allow limited axial translation therebetween. Valve body 378 is positioned in counterbore 358 for seating engagement with one end of bore 356 in plug member 314. Spring 380, which surrounds valve stem 374 between a collar thereon and plug member 314, urges valves 376 and 378 into seated engagement with bores 332 and 356, respectively. In addition, port 382 in the wall of upper diaphragm nut 326 allows for constant fluid communication between the interior thereof and control chamber 338.

A second check valve 384, which may comprise in its simplest form a spherical valve member positioned between a transverse pin and a choked passage, is positioned in line 386. Line 386 is connected between brake line 20 and conduit 352. By means of conduits 388 and 390, which tee into line 386 on opposite sides of check valve 384, limiting valve 304 and strut cylinder 306 are connected in parallel across check valve 384.

Limiting valve 304 includes a body 392 defining first and second chambers 394 and 396. First chamber 394 connects to the brake pipe side of check valve 384, while second chamber 396 connects to the brake cylinder line of check valve 384. Choke 398 functions to restrict the rate of fluid flow between chamber 396 and conduit 388.

Piston 400, slidably positioned within first chamber 394, has a peripheral annular groove in which is disposed an O-ring 402. O-ring 402 forms a sliding seal between piston 400 and the interior surface of body 392 so as to prevent leakage of fluid under pressure between the left and right portions of first chamber 394. Positioned in the right portion of chamber 394, intermediate the top of piston 400 and spring follower 404, is spring 406. Spring 406 is biased to counteract the force generated by the pressure in the left portion of chamber 394 acting against the bottom face of piston 400. The force exerted by spring 406 may be preset or adjusted by means of spring adjusting screw 408. Spring adjusting screw 408 is threadably mounted between the opposite end of body 392 and contacts spring follower 404. Consequently, it will be understood that conduit 388 may fluidly communicate with conduit 390 through chambers 394 and 396 subject to the action of valve 395.

Strut cylinder 306 includes a body 410 in which is disposed an extending strut 412. The body 410 includes a top chamber 414 separated from bottom chamber 416 by bore 418. Conduits 388 and 390 are ported, respectively, to chambers 414 and 416 of strut cylinder 306. Lower bore 420, which is coaxial with bore 418, slidably engages and guides strut 412 for translation. An O-ring 422 is provided within a peripheral annular groove of bore 420 to form a sliding seal with strut 412 so as to prevent leakage of pressurized fluid from chamber 416. The bottom end of strut 412 is reduced and threaded to receive contact nut 424. Valve body 426, attached near the top of strut 412, is located in top chamber 414. A spring 428 between the end of chamber 414 and valve body 426 urges strut 412 downwardly. Preferably, contact nut 424 should be adjusted so that valve 426 is open when the car is loaded at between 40% and 60% capacity. Accordingly, subject to the position of strut 412 and thus valve 426, fluid communication may exist between chambers 414 and 416.

The parts of brake control apparatus 300 illustrated in FIG. 5 and so far described function as follows. It will be understood that brake control apparatus 300 functions both prior to charging and during charging of the train brake system for operation as previously described with regard to brake control apparatus 10. FIG. 5 depicts control valve 302 and limiting valve 304 in a charged and ready condition.

When it is desired to set the brakes on an unloaded railway car using brake control apparatus 300, the pressure in brake pipe 18 is reduced in the usual manner (typically a staged reduction) by operation of the brake valve. The same pressure decrease is also experienced in conduits 352 and 390, as well as in supply chamber 336 of control valve 302. Since the railway car is unloaded, the sprung and unsprung portions of undercarriage 168 shown in FIG. 4 do not occupy a closer relative position which would cause stop 182 to interact with strut 412 of strut cylinder 306. Strut 412 is thus fully extended closing valve 426 as shown in FIG. 5. Consequently, there is no fluid communication through strut cylinder 306. Additionally since during a service brake application, a relatively small pressure drop occurs in the brake pipe in comparison to the drop in brake pipe pressure during an emergency brake application, valve 395 of limiting valve 304 remains closed. Check valve 384, under the pressure differential existing between brake line 20 and brake pipe 18, is also closed. Consequently, no pressurized fluid flows through check valve 384, limiting valve 304 or strut cylinder 306.

The pressure reduction in supply chamber 336 upsets the force balance on diaphragm assembly 316, which shifts downward as it seeks to regain a position of equilibrium. The downward shift of diaphragm assembly 316 unseats valve 376, while valve 378 remains closed. Thus, there is direct fluid communication between supply chamber 336 through bore 328, counterbore 330, bore 332 and counterbore 334 into control chamber 338. With fluid escaping from chamber 338 to chamber 336, the pressure in control chamber 338 drops rapidly toward that of supply chamber 336. Note that valve 378 stays closed biased by spring 380, while the spherical member of check valve 370 is seated due to a pressure differential across it. Therefore, the greater pressure stored in accumulator 366 is disconnected from brake control apparatus 300 at this time.

As the pressure in control chamber 338 drops, the downward force generated thereby also decreases allowing diaphragm assembly 316 to start upward. Diaphragm assembly 316 moves upward toward a position of equilibrium gradually closing valve 376. Equilibrium is achieved when the downward force generated by the pressure of control chamber 388 applied to the upper diaphragm assembly 316 balances the upward sum of the force of spring 340 and the force generated by the pressure of supply chamber 336 applied to the lower face of diaphragm assembly 316. Since the upward force of spring 340 is constant and the force generated by a pressure is directly proportional to the area over which that pressure is applied, a given pressure drop over a larger area must be balanced by a greater pressure drop over a smaller area. For example, if the ratio of the areas of diaphragm assembly 316 abutting chambers 336 and 338 were 1:2, a pressure drop of four (4) psi in chamber 336 in conjunction with a constant spring force would be equalized by a two (2) psi pressure drop in chamber 338. The end areas of movable diaphragm assembly 316 abutting chambers 336 and 338 may be selectively sized to proportion the relative pressure drops between said chambers as desired. Consequently, diaphragm assembly 316 moves upward, closing valve 376 and halting the decrease of pressure in control chamber 338. Therefore, the pressure drop signal actuating the brakes of an unloaded railway car through brake line 20 is smaller than that which occurred in brake pipe 18 by the inverse ratio of the areas of diaphragm assembly 316 abutting chambers 338 and 336, respectively.

Note that should the given pressure drop signal in brake pipe 18 exceed a predetermined limit, such as during an emergency brake application, spring 406 of limiting valve 304 would be rendered effective to open normally closed valve 395. Consequently, limiting valve 304 serves as an optional safety device by bypass control valve 302, applying the brakes of an unloaded railway car with the greater pressure reduction of brake pipe 18 under emergency conditions. Adjustment of spring adjusting screw 408 schedules limiting valve 304.

When it is desired to release the brakes of an unloaded railway car, operation of the brake valve brings the pressure in the brake pipe 18 up. The increase in the pressure in supply chamber 336 and the force of spring 340 again creates a force imbalance on diaphragm assembly 316. Diaphragm assembly 316 moves upward against the nominal yielding resistance of spring 380 to engage and close valve 376. The upward displacement of diaphragm assembly 316 overrides the lost motion connection between valve 378 and valve stem 374 to open valve 378 allowing fluid communication with pressure accumulator 366. Consequently, pressure in control chamber 338 and brake line 20 rises to effect brake release and to move diaphragm assembly 316 back to a position of equilibrium where valves 376 and 378 are closed. However, due to the different surface areas of diaphragm assembly 316 abutting chambers 336 and 338, the rate of pressure rise in brake line 20 is less than that in brake pipe 18. For example, if the ratio of the areas of diaphragm assembly 316 abutting chambers 336 and 338 were 1:2, the pressure rise in brake line 20 would take place at one-half the rate of pressure rise in brake pipe 18. It will be understood that the pressure in accumulator 366 never falls below the pressure in brake supply line 18, since check valves 370 and 384 would open to allow brake pipe 18 to recharge accumulator 366. Pressure accumulator 366 should be of sufficiently large volume so that the pressure drain or draw-down experienced to release the brakes does not exceed some nominal value, two (2) psi for instance, thereby substantially preserving the pressure reservoir therein. Therefore, it will be seen that chambers 336 and 338 are once again charged at equal pressures and that brake control apparatus 300 is ready for the next brake application on an unladen railway car.

When it is desired to set the brakes on a loaded railway car with brake control apparatus 300, the pressure in brake pipe 18 is reduced in the usual manner (typically a staged reduction) by operation of the brake valve. The same pressure decrease is also experienced in conduits 352 and 390, as well as in supply chamber 336 of control valve 302. However, since the railway car is loaded, the sprung and unsprung portions of undercarriage 168 shown in FIGS. 3 and 4 occupy a closer relative position causing stop 182 to contact strut 412 and thus open valve 426 of strut cylinder 306. Consequently, a direct line of communication exists from conduit 390 through strut cylinder 306 to conduits 388 and 386. Therefore, the pressure drop signal actuating the brakes of a loaded railway car through brake line 20 is identical to that which occurred in brake pipe 18.

With regard to releasing the brakes on a loaded railway car, there being a direct open circuit between brake pipe 18 and brake line 20, operation of a remote brake valve (not shown) brings up the pressure simultaneously in brake pipe 18 and brake line 20. Brake release is thus effected, and brake control apparatus 300 is ready for the next brake application on a laden railway car.

Referring now to FIG. 6, there is shown a modification of strut cylinder 306 which may be used with unloaded, loaded or partially loaded railway cars. FIG. 6 shows a strut cylinder 450, which includes a body 452 having an upper chamber 454, a central chamber 456 and a lower chamber 458. A port 460 in the wall of central chamber 456 unites with conduit 388, while port 462 in the wall of chamber 458 unites with conduit 390.

Disposed within strut cylinder 450 and extending through chambers 454, 456, and 458 is valve stem assembly 464, comprising valve stem 466 and strut 468. Piston 470, secured to the upper end of valve stem 466, is slidably disposed within chamber 454. Piston 470 includes a peripheral annular groove having disposed therein O-ring 472. O-ring 472 forms a sliding seal between piston 470 and the interior surface of chamber 454 to confine pressurized fluid beneath the lower face of piston 470. Spring 474 is disposed within the upper portion of chamber 454, between the upper face of the piston 470 and spring follower 476. Spring follower 476 includes a depression in its upper surface for receiving and centering spring adjusting screw 478, which is threadably mounted substantially centrally through the top end of body 452. Thus, by means of spring adjusting screw 478, the downward biasing force of spring 474 against valve stem 466 may be set to a predetermined value and/or adjusted from the outside of strut cylinder 450 without any disassembly thereof. A jam nut 480 threadably engages the exterior end of body 452 to cover and protect the protruding end of spring adjusting screw 478. A lock washer 482 may be placed between jam nut 480 and the top end of body 452 to further secure jam nut 480 under conditions of high vibration typically encountered during railway operations.

Valve stem 466 extends downwardly from piston 470 through bore 484, chamber 456 and bore 486 into chamber 458. Opening 488 also connects chambers 454 and 456. Bores 484 and 486 are coaxially oriented. Valve body 490, intermediately mounted on valve stem 466 within central chamber 456, seats in bore 486 located in the bottom of chamber 456. The position of valve 490 functions to open or close fluid communication between chambers 456 and 458 under certain conditions.

The bottom end of valve stem 466 couples to the upper end of strut 468 within chamber 458. The connection between valve stem 466 and strut 468 is of the lost motion type, such as pin and slot arrangement 492. Spring follower 494 is secured near the upper end of strut 468. Another spring follower 496 is mounted near the lower end of valve stem 466. Placed between spring followers 494 and 496, spring 498 surrounds the connecting ends of valve stem 466 and strut 468. Consequently, valve stem 466 and strut 468 are telescopingly connected with pin and slot arrangement 492 and biased apart by spring 498.

The remaining portion of strut 468 slidably extends through a coaxial bore 500 located in the lower end of the body 452. O-ring 502, disposed within a peripheral annular groove in bore 500, forms a sliding seal with strut 468 to prevent pressure leakage from strut cylinder 450. Contact nut 504 engages the reduced and threaded end of strut 468. Accordingly, subject to the amount of extension of strut 468, and thus the position of valve 490, conduits 388 and 390 may or may not be in fluid communication.

It will be understood that strut cylinder 450 senses the condition of railway car loading in a manner similar to that of strut cylinder 200, which was earlier discussed. When used with strut cylinder 450, brake control apparatus 300 is adjusted for operation as follows. Depending upon the setting of contact nut 504, the inward translation of strut 468 causes increased compression within spring 498 tending to open valve 490. The counteracting force of spring 474 is then set by means of adjusting screw 478 so that valve 490 is closed. Thus the position of valve 490 is a function of the interaction of springs 474 and 498, and the pressures within control chamber 338 and supply chamber 336. It will be understood that brake control apparatus 300 incorporating the modification shown in FIG. 6 functions similarly to that previously described both prior to charging and during charging of the train brake system for operation. FIG. 5 depicts control valve 302 and limiting valve 304 in a charged and ready condition.

The brake set sequence on an unloaded railway car is substantially similar to that which was described above. Briefly, operation of the brake valve drops the pressure in brake pipe 18, conduits 352 and 390, as well as in supply chamber 336 of control valve 302. Since the railway car is unloaded the sprung and unsprung portions of undercarriage 168 do not occupy a closer relative position causing stop 182 to contact strut 468 of strut cylinder 450. Strut 468 is thus fully extended closing valve 490 as shown in FIG. 6. Consequently, there is no fluid communication through check valve 384, limiting valve 304, nor through strut cylinder 450. With a pressure supply chamber 336 now lower than pressure in control chamber 338, diaphragm assembly 316 shifts downward opening valve 376. With direct fluid communication between chambers 336 and 338, the pressure in control chamber 338 drops rapidly toward that of supply chamber 336. Since the force generated by a smaller pressure drop over a larger area neutralizes the force generated by a given pressure drop over a smaller area, diaphragm assembly 316 thus moves upward to close valve 376, halt the decrease of pressure in chamber 338, and resume a position of equilibrium. Therefore, the pressure drop signal actuating the brakes of an unloaded railway car through brake line 20 is smaller than that which occurred in brake pipe 18 by the inverse ratio of the areas of diaphragm assembly 316 abutting chambers 338 and 336, respectively.

Setting the brakes on a loaded railway car with strut cylinder 450 in brake control apparatus 300 also proceeds as was described above. Briefly, operation of the brake valve causes a given pressure reduction in brake pipe 18, conduits 352 and 390, as well as in supply chamber 336 of control valve 302. Since the railway car is loaded, the sprung and unsprung portions of undercarriage 168, shown in FIGS. 3 and 4, occupy a closer relative position whereby projecting stop 182 has pushed strut 468 into strut cylinder 450 causing increased compression within spring 498 tending to push valve stem 466 upward, which in turn compresses spring 474. With valve stem 466 and strut 468 thus relatively closer, valve stem assembly 464 is so positioned that valve 490 is unseated. With open fluid communication between conduits 388 and 390, the fluid follows the path of least resistance so that the pressure drop signal actuating the brakes of a fully loaded railway car through brake line 20 is identical to the pressure drop signal in brake pipe 18.

The primary advantage in using strut cylinder 450 with brake control apparatus 300 is evident when applying brakes to a partially loaded car. As usual, operation of the brake valve causes a given pressure drop to occur in brake pipe 18, conduits 352 and 390 and supply chamber 336 of control valve 302. Less pressure now present in supply chamber 336, diaphragm assembly 316 shifts downward from its former position of equilibrium, unseating valve 376. With direct fluid communication between chambers 336 and 338, the pressure in control chamber 338 begins decreasing.

Since the railway car is only partially loaded, stop 182 pushes strut 468 into body 452 a relatively lesser distance causing increased compression of spring 498 tending to push valve stem 466 upward. Consequently, strut 468 and valve stem 466 assume closer relative positions whereby spring 474 is compressed. Note, however, that the resulting compression of spring 498 exerts an upward force on valve stem 466 which partially lifts valve 490 from its seat. Accordingly, initial fluid communication exists between conduits 388 and 390 through chambers 456 and 458 of strut cylinder 450 as if the railway car were fully loaded. Since chamber 454 fluidly communicates with control chamber 338 via chamber 456, conduits 388 and 386 and brake line 20, pressure simultaneously decreases in chamber 454. Consequently, the decreasing pressure of control chamber 338 in control valve 302 eventually renders spring 474 of strut cylinder 450 effective to move valve 490 toward a closed position, as though the railway car were unloaded. Note that were the pressure in brake pipe 18 to drop to a predetermined emergency level, limiting valve 304 would function as previously described to apply the full brake pipe pressure drop regardless of the degree of loading in the railway car. Therefore, the pressure drop signal actuating the brakes of a partially laden railway car through a brake line 20 is initially the brake signal corresponding to a loaded car and finally the relatively smaller brake signal corresponding to an unloaded car.

The ability of strut cylinder 450 to tailor the braking signal in relation to the extent of railway car loading comprises a significant advantage. It is again pointed out that strut cylinder 450 may be scheduled in two ways. First, with spring adjusting screw 478, spring 474 may be preset to close valve 490 when the pressure in control chamber 338 drops to a predetermined level. Second, by means of contact nut 504, the point of engagement with projecting stop 182 may be preset to compensate for various empty weights of various type railway cars.

The release of the brakes on a loaded, unloaded or partially loaded railway car proceeds exactly as was described before. Briefly, operation of the brake valve increases the pressure in brake pipe 18, conduits 352 and 390, and supply chamber 336. Check valve 384 experiences a pressure differential and opens to allow fluid at the higher pressure of supply chamber 336 to enter control chamber 338 by means of lines 386 and 20. Simultaneously, diaphragm assembly 316 moves upward to close valve 376, whereby the pressures in chambers 336 and 338 equalize in anticipation of the next brake application.

Figure 7:
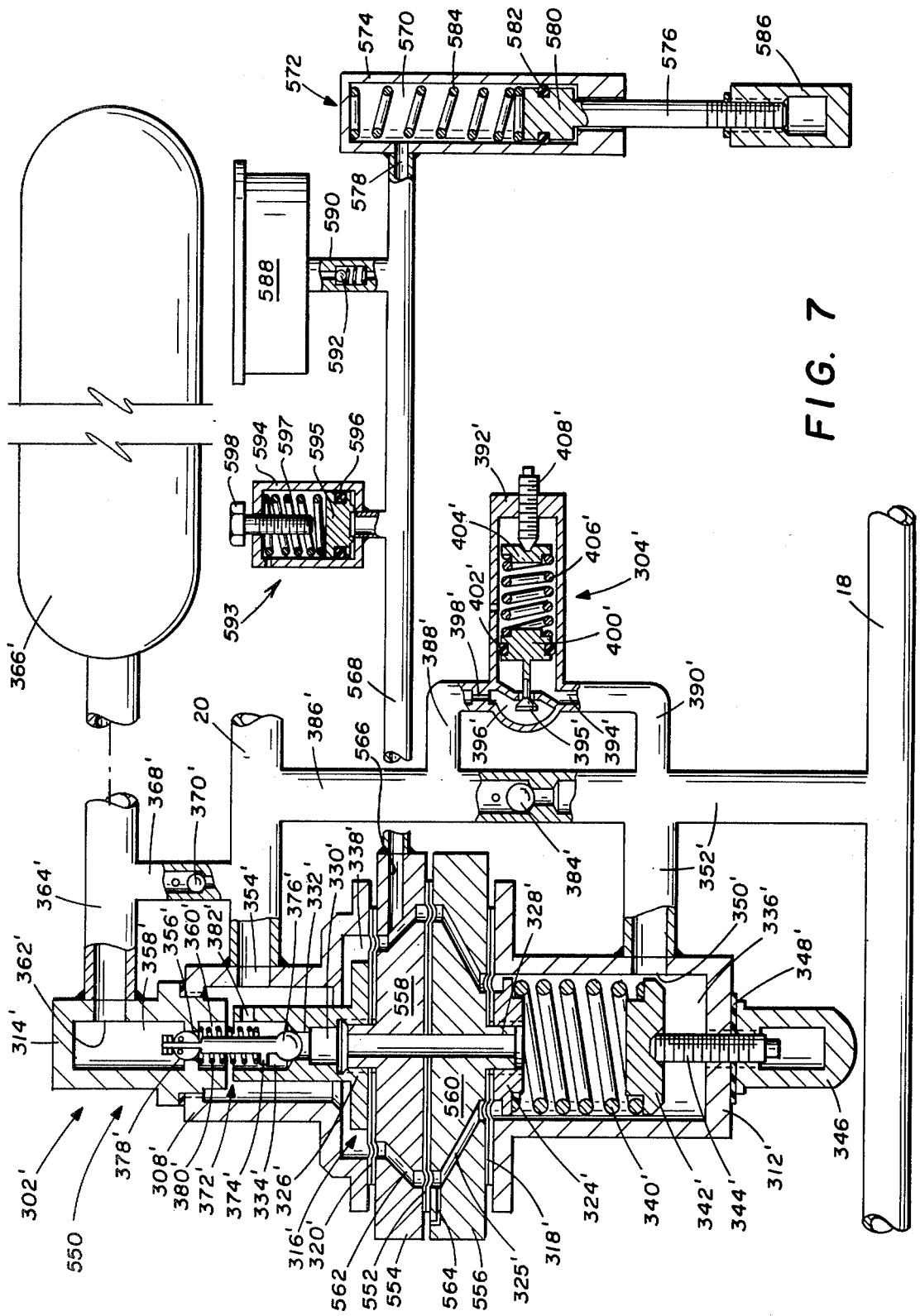
FIG. 7 is a vertical cross-sectional view of a brake control apparatus for railway cars incorporating a third embodiment of the invention.

Referring now to FIG. 7, there is shown a brake control apparatus 550 incorporating a third embodiment of the invention. Brake control apparatus 550 includes numerous component parts which are substantially indentical in construction and in operation to the component parts of apparatus 300 illustrated in FIG. 5. Such identical component parts are designated in FIG. 7 with the same reference numerals utilized in the description of apparatus 300, but are differential therefrom by means of a prime (') designation.

One distinction between brake control apparatus 300 and brake control apparatus 550 is the inclusion of a third diaphragm 552 in control valve 302'. The outer periphery of third diaphragm 552 is clamped between upper intermediate casing section 554 and lower intermediate casing section 556. The inner periphery of third diaphragm 552 is clamped between upper diaphragm follower 558 and lower diaphragm follower 560. Thus, it will be apparent that third diaphragm 552 separates the volume in control valve 302' between diaphragms 318' and 320' into annular spaces 325' and 562. Preferably, lower annular space 325' is open to atmosphere for relieving back pressure through vent 564 located in the wall of lower intermediate casing section 556. Thus, diaphragms 318', 320' and 552 flexibly suspend diaphragm assembly 316' for limited axial translation within control valve 302'.

Upper annular space 562 fluidly communicates through port 566 in upper intermediate casing section 554 and through conduit 568 with chamber 570 in strut cylinder 572. Strut cylinder 572 includes a body 574 in which is disposed an extending strut 576. A port 578 in the wall of body 574 connects chamber 570 with conduit 568. Slidably disposed within chamber 570 is piston 580, from the bottom face of which extends strut 576. The volumes of space 562, conduit 568 and chamber 570 are sized so that the fluid displaced upon maximum compression of strut 576 moves diaphragm assembly 316' to its lower limit. Piston 580 includes a peripheral annular groove in which O-ring 582 is located. O-ring 582 forms a sliding seal between piston 580 and the interior surface of body 574 so as to prevent leakage of fluid pressure across piston 580 between the upper and lower portions of chamber 570. A spring 584 interposed within chamber 570 between the top end of body 574 and piston 580 urges strut 576 downwardly. The bottom end of strut 576 is reduced and threaded to receive a contact nut 586. In accordance with the preferred construction, spring 584 comprises a relatively light spring adequate to overcome frictional resistance between piston 580 and body 574 so as to maintain strut 576 in extended condition.

Reservoir 588 is connected to conduit 568 between control valve 302' and strut cylinder 572. Line 590 connected between reservoir 588 and conduit 568 includes a check valve 592, which in its simplest form may consist of a spherical valve member biased by a spring in a choked passageway in line 590. Fluid from reservoir 588 is drawn past valve 592 by the outward movement of strut 576 and piston 580 to replenish any lost fluid in conduit 568. Reservoir 588 as well as upper annular space 562, conduit 568 and chamber 570 contain an incompressible fluid, such as hydraulic fluid.

Preferably, apparatus 550 includes small chamber 593 connected between strut cylinder 572 and control valve 302'. Chamber 593 is defined by a body 594 within which piston 595 is slidably disposed. Piston 595 includes a peripheral annular groove for O-ring 596 to form a seal with body 594. A light spring 597 opposes movement of piston 595 in response to a pressure increase in conduit 568. Maximum displacement of piston 595 is limited by stop screw 598. Chamber 593 thus constitutes a small variable volume into which a very small amount of fluid from conduit 568 can be displaced.

It will be understood that the use of an incompressible fluid in one portion of apparatus 550 in conjunction with a compressible fluid, such as air, throughout the remainder of the apparatus comprises the primary feature of the third embodiment of the invention. Placement of incompressible fluid between strut cylinder 572 and control valve 302' enables direct hydraulic actuation of diaphragm assembly 316' in a more simplified manner. Adjustment of apparatus 550 is facilitated also.

Moreover, the consequent reduction in the number of connections to pneumatic brake conduits lessens the possibility of pressure loss or leakage therefrom. Thus, brake control apparatus 550 comprises a pneumatic/hydraulic device rather than a completely pneumatic device.

Brake control apparatus 550 illustrated in FIG. 7 operates as follows. It will be understood that apparatus 550 functions both before and during charging of the train brake system for operation as previously described with regard to brake control apparatus 300, with the exception that incompressible fluid now occupies strut cylinder 572 and a portion of control valve 302' in apparatus 550. FIG. 7 depicts brake control apparatus 550 in a charged and ready condition.

When it is desired to set the brakes on an unloaded railway car using brake control apparatus 550, the pressure in brake pipe 18 is reduced in the usual manner (typically a staged reduction) by operation of the remote brake valve. The same pressure decrease is also experienced in conduits 352' and 390', as well as in supply chamber 336' of control valve 302'. Since the railway car is unloaded, the sprung and unsprung portions of the undercarriage do not occupy a closer relative position which would cause strut 576 to be pushed into strut cylinder 572. Strut 576 is thus fully extended whereby no hydraulic force is exerted on diaphragm assembly 316'. Additionally, since a relatively small pressure drop occurs in brake pipe 18 during a service brake application, as opposed to the greater drop in brake pipe pressure during an emergency brake application, valve 395' of limiting valve 304' remains closed. Check valve 384' also remains closed under the pressure differential between brake line 20 and brake pipe 18. Consequently, no pressurized fluid flows through check valve 384' or limiting valve 304'.

The pressure reduction in supply chamber 336' changes the force balance on diaphragm assembly 316', which shifts downward as it seeks to regain a position of equilibrium. The downward shift of diaphragm assembly 316' unseats valve 376', while valve 378' remains closed. As diaphragm assembly 316' shifts downward, piston 595 moves contracting the volume of chamber 593 to take up the fluid slack between strut cylinder 572 and valve 302'. This prevents the downward shift of assembly 316' from drawing fluid from reservoir 588. Thus, there is direct fluid communication between supply chamber 336' and control chamber 338'. With fluid escaping from chamber 338' to chamber 336', the pressure in control chamber 338' drops rapidly toward the pressure level of supply chamber 336'. Valve 378' remains closed biased by spring 380', while the spherical member of check valve 370' remains seated due to a pressure differential across it. Therefore, the greater pressure stored in accumulator 366' is disconnected from brake control apparatus 550 at this time.

As the pressure in control chamber 338' drops, the downward force generated thereby also decreases allowing diaphragm assembly 316' to start upward eventually closing valve 376'. Equilibrium is achieved when the downward force generated by the pressure of control chamber 338' applied to the upper diaphragm assembly 316' balances the upward sum of the force of spring 340' and the force generated by the pressure of supply chamber 336' applied to the lower face of diaphragm assembly 316'. Since the upward force of spring 340' is constant and the force generated by a pressure is directly proportional to the area over which that pressure is applied, a given pressure drop over a larger area must be balanced by a greater pressure drop over a smaller area. It will be apparent that the end areas of movable diaphragm assembly 316' abutting chambers 336' and 338' may be selectively sized to proportion the relative pressure drops between said chambers as desired. Consequently, diaphragm assembly 316' moves upward, closing valve 376' and halting the decrease of pressure in control chamber 338'. Piston 595 moves expanding the volume of chamber 593 to take up the fluid slack and allow assembly 316' to close valve 376'. Therefore, the pressure drop signal actuating the brakes of an unloaded railway car with apparatus 550 through brake line 20 is smaller than that which occurred in brake pipe 18 by the inverse ratio of the areas of diaphragm assembly 316' abutting chambers 338' and 336', respectively.

It will thus be understood that brake control apparatus 550 illustrated in FIG. 7 operates substantially the same as brake control apparatus 300 shown in FIG. 5 when setting the brakes on an unloaded railway car. Limiting valve 304' also operates in a similar fashion, and release of the brakes of an unloaded railway car with brake control apparatus 550 proceeds as was hereinbefore described with regard to the embodiment shown in FIG. 5.

The operational significance of brake control apparatus 550 is noticed when setting the brakes on a loaded or partially loaded railway car. With the usual reduction of pressure in brake pipe 18, identical pressure decreases are experienced in conduits 352' and 390', as well as in supply chamber 336' of control valve 302'. However, since the railway car is loaded to some extent, the sprung and unsprung portions of its undercarriage occupy a closer relative position pushing 576 into strut cylinder 572. Accordingly the inward movement of piston 580 increases the pressure of the fluid within chamber 570, conduit 568 and annular space 562. Since the fluid between annular space 562 and chamber 570 is an incompressible fluid, such as hydraulic fluid, the force applied by piston 580 is transferred directly through the imcompressible medium to diaphragm assembly 316'. Chamber 593 is of relatively small volume whereby the amount of fluid displaced therein is negligible compared to that displaced by strut cylinder 572. Consequently, diaphragm assembly 316' is hydraulically actuated downwardly by strut cylinder 572 to open valve 376. It will be understood that fluid communication between chambers 336' and 338' is sustained by the hydraulic force generated by strut cylinder 572 applied to diaphragm assembly 316'. Preferably, contact nut 586 is adjusted so that valve 376' will be kept open from the point when the railway car is loaded at between 40% and 60% capacity. Therefore, the pressure drop signal actuating the brakes of a loaded or partially loaded railway car through brake line 20 with apparatus 550 is identical to the pressure drop which occurred in brake pipe 18. Apparatus 550 shown in FIG. 7 is thus an on/off device.

With regard to releasing the brakes on a loaded or partially loaded railway car with brake control apparatus 550, operation of a remote brake valve (not shown) brings up the pressure in brake pipe 18 and brake line 20 simultaneously since there is a direct open circuit therebetween. Brake release is thus effected, and brake control apparatus 550 is ready for the next brake application.

Figure 8:
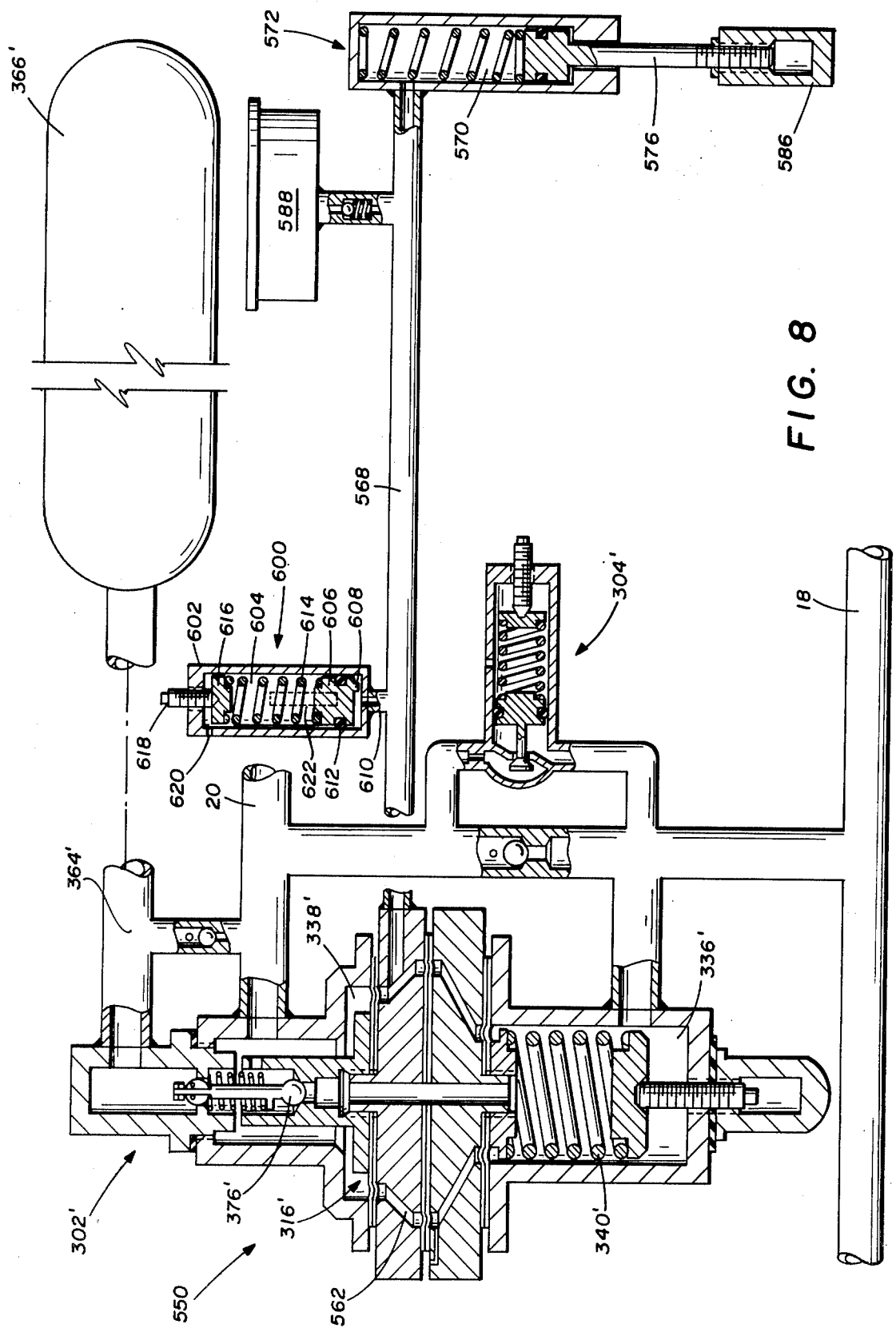
FIG. 8 is a vertical cross-sectional view of a first modification of the brake control apparatus of FIG. 7.

Referring now to FIG. 8, there is shown a first modification of brake control apparatus 550 which may be used with unloaded, loaded or partially loaded railway cars. FIG. 8 shows regulator 600 positioned in conduit 568 between strut cylinder 572 and control valve 302'. Regulator 600 includes a body 602 defining a chamber 604 therein. Slidably disposed within chamber 604 is a piston 606. A stop 608 is provided on the lower face of piston 606 to prevent the piston from seating across the bottom of body 602 from which line 610 leads to conduit 568. Thus, the fluid pressure within conduit 568 is always applied over the entire face of piston 606.

Piston 606 includes a peripheral annular groove in which O-ring 612 is disposed. O-ring 612 forms a sliding seal between piston 606 and the interior surface of body 602 to prevent leakage of fluid pressure thereacross. Spring 614 is positioned in chamber 604 intermediate spring follower 616 and the top of piston 606. Spring 614 is biased to counteract the force generated by the pressure in conduit 568 acting against the bottom face of piston 606. The force exerted by spring 614 may be preset or adjusted with spring adjusting screw 618. Spring adjusting screw 618 is threadably mounted through the top end of body 602 and engages spring follower 616. A small port 620 is located in the upper wall of body 602 to allow any back pressure caused by movement of piston 606 to vent to atmosphere.

Piston 606 is thus responsive to pressure changes in conduit 568. An increase of fluid pressure therein urges piston 606 toward follower 616. The rate at which piston 606 moves is a function of the selected spring constant for spring 614. If desired, structure 622 can be located between piston 606 and follower 616 to limit relative movement, and thus limit the maximum pressure absorbed by regulator 600. Structure 622 as shown in FIG. 8 is attached to piston 606 and can comprise, for example, a rigid stop, a compression spring or a plurality of concentric compression springs. Consequently, regulator 600 can be adjusted to compensate for preselected pressure increases in conduit 568, which effect diaphragm assembly 316'.

The operation of brake control apparatus 550 when utilizing regulator 600 proceeds as follows. It will be understood that the pressure drop signal actuating the brakes of an unloaded railway car through brake line 20 is smaller than the pressure drop which occurs in brake pipe 18 by the inverse ratio of the areas of diaphragm assembly 316' abutting chamber 338' and 336', respectively, as was hereinbefore discussed. Regulator 600 is inoperative when the car is empty since there is no pressure in conduit 568. The pressure drop signal actuating the brakes of a fully loaded railway car through brake line 20 is identical to the pressure drop which occurs in brake pipe 18 as was also hereinbefore discussed. In this case, regulator 600 is overridden whereby the pressure in conduit 568 holds diaphragm assembly 316' down and valve 376' open. Thus, brake actuation for either empty or fully loaded railway cars with brake control apparatus 550 incorporating regulator 600 is unaffected.

The primary advantage in using regulator 600 with brake control apparatus 550 is evident when applying brakes to a partially loaded railway car. As usual, operation of the remote brake valve (not shown) causes a desired pressure drop in brake pipe 18, conduits 352' and 390', and in supply chamber 336' of control valve 302'. With less pressure now present in supply chamber 336', diaphragm assembly 316' shifts downward from its former position of equilibrium to unseat valve 376' allowing the pressure in control chamber 338' to decrease.

Since the railway car is but partially loaded, the increase in fluid pressure in annular space 562, conduit 568 and chamber 570 is relatively less than that which would be caused by a fully loaded railway car. The total hydraulic force will therefore be absorbed between regulator 600 and diaphragm assembly 316'. The exact amount of hydraulic force absorbed by regulator 600 is determined by the compressive setting of spring 614 and the selection of structure 622. Since spring force is directly proportional to the amount of displacement thereof, it will be appreciated that the opposing force generated by regulator 600 varies directly with the amount of displacement of spring 614. Consequently, regulator 600 diverts part of the hydraulic force generated by strut cylinder 572 in an amount corresponding to the position of strut 576, which corresponds to the loading condition of the railway car. Structure 622 limits the maximum force absorbed by regulator 600, after which any force increase affects diaphragm assembly 316' alone. Therefore the amount of hydraulic force affecting control valve 302' is controlled through reduction in this manner.

The pressure reduction in supply chamber 336' changes the force balance on diaphragm 316', which shifts downward as it seeks to regain a position of equilibrium. Valve 378' remains closed as valve 376' is opened to establish fluid communication between supply chamber 336' and control chamber 338'. The pressure in control chamber 338' thus drops rapidly toward the pressure level of supply chamber 336'.

As the pressure in control chamber 338' drops, the downward force generated thereby also decreases allowing diaphragm assembly 316' to start upward toward a position of equilibrium wherein valve 376' is closed. Equilibrium is achieved when the downward sum of the force generated by the pressure of control chamber 338' applied to the upper face of diaphragm assembly 316' and the hydraulic force generated by strut cylinder 572 balances the upward sum of the force of spring 340' and the force generated by the pressure of supply chamber 336' applied to the lower face of diaphragm assembly 316'. Since the upward force of spring 340' is constant, as is the hydraulic force component generated by strut cylinder 572 and reduced by regulator 600, and because the force generated by a pressure is directly proportional to the area over which that pressure is applied, a given pressure drop over a larger area must be balanced by a greater pressure drop over a smaller area.

For example, assume that the ratio of the areas of diaphragm assembly 316' abutting chambers 336' and 338' is 1:2, and that the added downward force applied to diaphragm assembly 316' after compensation by regulator 600 is one (1) pound. Under these conditions a pressure drop of four (4) psi in chamber 336' in conjunction with a constant spring 340' force would be equalized by a two and one-half (2½) psi pressure drop in chamber 338' together with a constant hydraulic force of one (1) pound. Thus, to achieve equilibrium the pressure in chamber 338' drops relatively more than it would in the absence of the extra force component from strut cylinder 572. It will be understood that the end areas of movable diaphragm assembly 316' can be selectively sized to proportion the relative pressure drops between said chambers as desired. Accordingly, diaphragm assembly 316' moves upward closing valve 376' and halting the decrease of pressure in control chamber 338'. Therefore the pressure drop signal actuating the brakes of a partially loaded railway car through brake line 20 is a brake signal relatively larger than that corresponding to an unloaded car.

It will be appreciated, however, that this relationship occurs only when regulator 600 is operative. Regulator 600 is inoperative, of course, when the railway car is empty because no hydraulic force is generated by strut cylinder 572. Depending upon the compressive setting thereof, regulator 600 can also be effectively inoperative for some partial loadings with small brake pipe pressure drops. Under these conditions the pressure drop signal actuating the brakes of a partially loaded car would correspond to that for a fully loaded car for small pressure drops until regulator 600 comes into play. Thus, apparatus 550 with regulator 600 functions as an on/off device for small pressure drops when regulator 600 is inactive, as well as when regulator 600 is inactive from overriding.

The ability of brake control apparatus 550 incorporating regulator 600 to tailor the braking signal in relation to the extent of railway car loading comprises a significant advantage. Apparatus 550 can be scheduled for operation with a few simple adjustments. First, with spring adjusting screw 618 regulator 600 can be preset to absorb part of the hydraulic force generated by strut cylinder 572 at a predetermined rate. This enables the pressure in brake line 20 to be regulated as a function of an additional constant force component acting on diaphragm assembly 316'. Provision of structure 622 permits further regulation of the maximum force absorbed by regulator 600 so that full brake force comes on at the desired car loading. Second, by adjustment of contact nut 586, the point of engagement with projecting stop 182 (shown in FIG. 4) can be preset to compensate for the empty weights of various type railway cars, or to preselect the car loading at which strut cylinder 572 is first activated.

Figure 10:
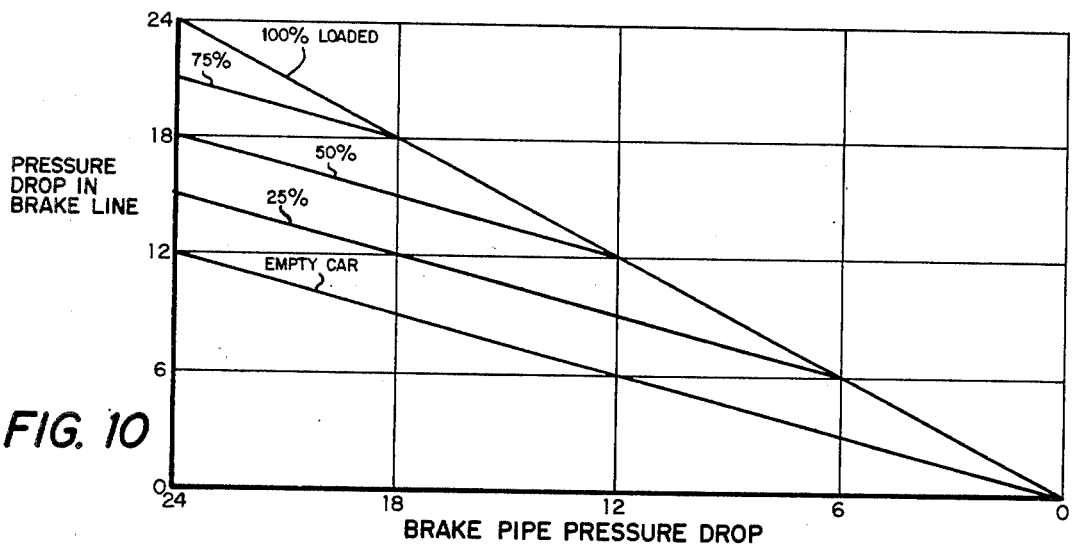
FIGS. 10, 11 and 12 are operational graphs of the brake control apparatus of FIG. 7 incorporating the modification of FIG. 8.
Figure 11:
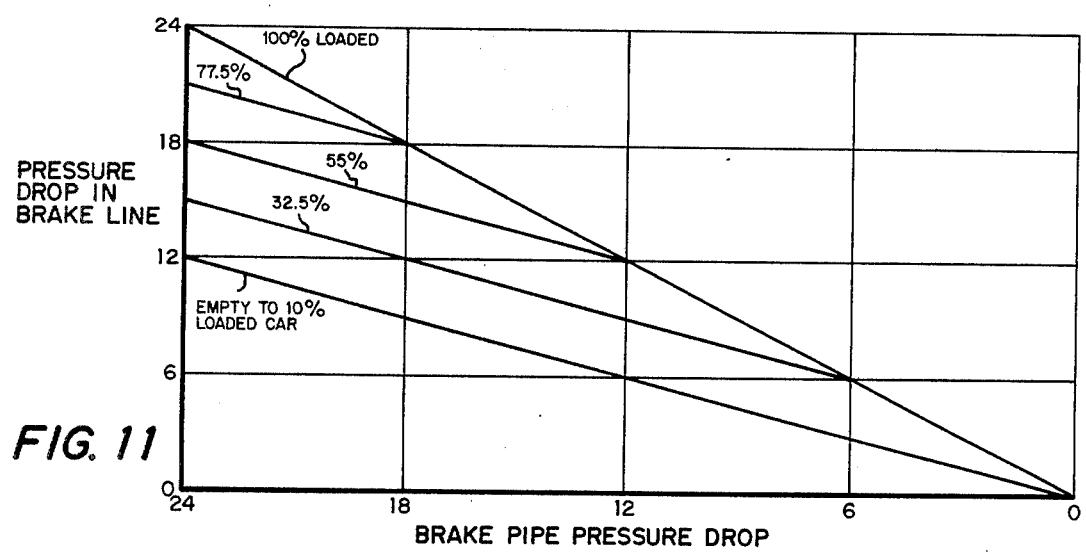
Figure 12:
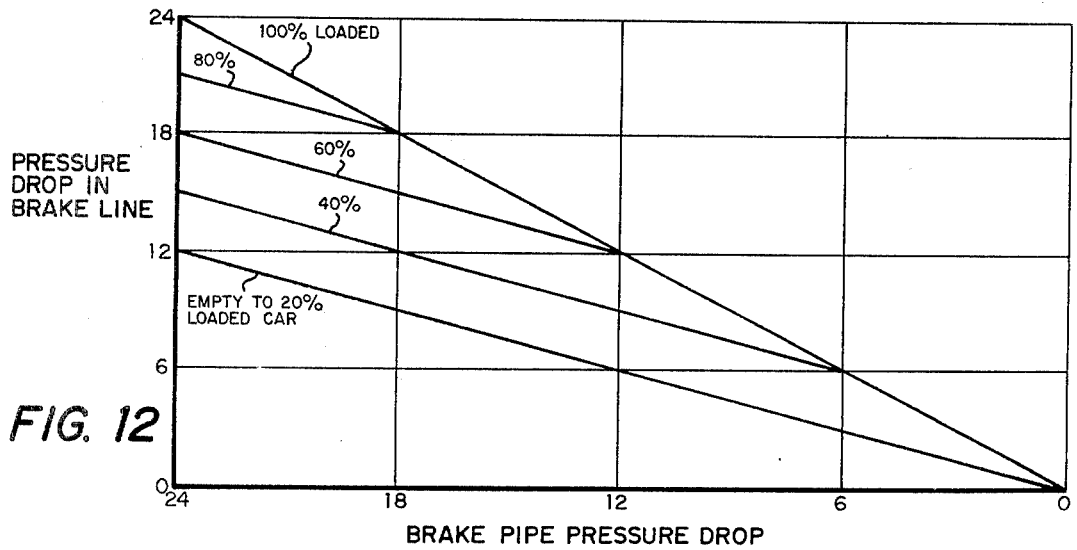

The graphs contained in FIGS. 10, 11 and 12 illustrate brake response of apparatus 550 with regulator 600 when the ratio of the areas of diaphragm assembly 316' abutting chambers 336' and 338' is 1:2. In each of the graphs, regulator 600 is adjusted to condition the effective force exerted on diaphragm assembly 316' by strut cylinder 572 to six (6) pounds per 25% of strut travel. Since the pressure drop in brake line 20 cannot exceed the pressure drop in brake pipe 18, the brake response is "on/off" for partially loaded cars until a sufficient pressure drop has occurred in brake pipe 18 enabling the pressure in brake line 20 (together with the constant hydraulic force) to rebalance diaphragm assembly 316'. Thereafter, the brakes of a partially loaded car are applied in parallel fashion a constant value higher than that for an empty railway car. In particular, FIG. 10 represents the case where strut cylinder 572 is operative over the complete range of car loading. On the other hand, FIGS. 11 and 12 illustrate brake response when strut cylinder 572 is adjusted for operation beginning with 10% and 20% car loadings, respectively. Until the predetermined loading is reached, the brakes are applied as if the car were empty. In effect then, a given brake signal is being applied to a railway car of higher actual weight. When strut cylinder 572 is adjusted for delayed contact, it is pointed out that the compressive setting of regulator 600 should be increased so that the brakes are full on for a fully loaded car in spite of the fact that strut cylinder 572 is not compressed to its maximum. For clarity, the effect of structure 622 is not shown in FIGS. 10, 11 and 12. However, it will be appreciated that the inclusion of structure 622 in regulator 600 enables precise setting of the desired loading at which the brakes will be fully on. Therefore, it will be understood that the brake response for railway cars can be tailored across the entire range of car loadings.

Figure 9:
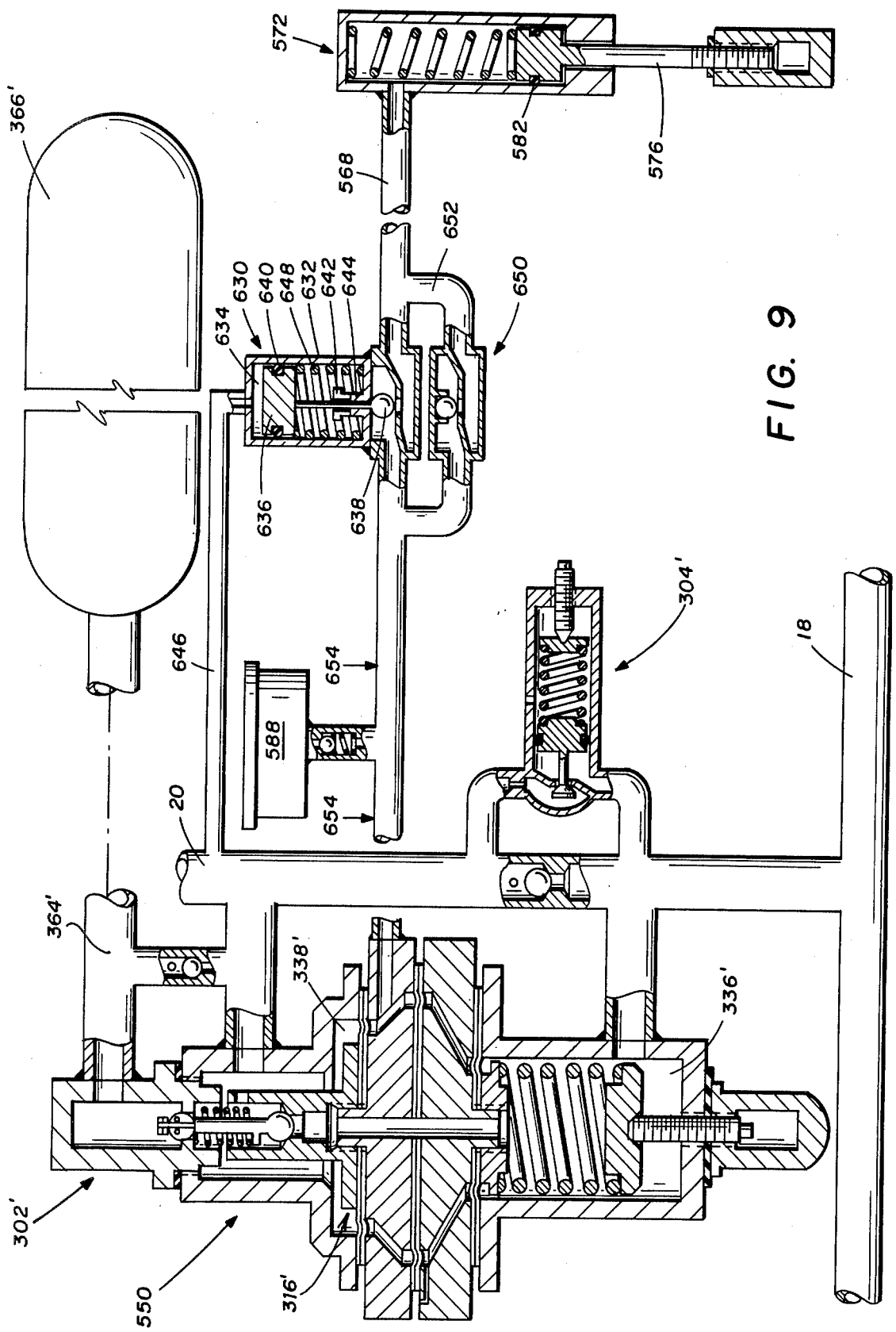
FIG. 9 is a vertical cross-sectional view of a second modification of the brake control apparatus of FIG. 7.

In reference to FIG. 9, there is shown a second modification of brake control apparatus 550 which can be used with loaded, empty or partially loaded railway cars. FIG. 9 shows valves 630 and 650 connected to conduit 568 between reservoir 588 and strut cylinder 572. Valve 630 includes a body 632 defining a chamber 634. Slidably disposed within chamber 634 is piston 636, from the bottom face of which extends valve member 638. Piston 636 includes a peripheral annular groove with O-ring 640 disposed therein. O-ring 640 forms a sliding seal between piston 636 and the interior surface of body 632 to prevent leakage of fluid pressure thereacross. A packing nut 642, through which the stem of valve member 638 is slidably received, threadably engages a sleeve attached to conduit 568 to compress and retain packing material 644 in sealing engagement with the stem of valve member 638. Conduit 646 provides fluid communication between valve 630 and brake line 20. Spring 648 counteracts the force generated by the pressure in brake line 20 applied to piston 636. Check valve 650, located in bypass line 652, allows incompressible fluid to flow only from strut cylinder 572 to control valve 302'. Consequently, it will be understood that communication between strut cylinder 572 and valve 302' depends on the actions of valve member 638 and check valve 650.

When utilized in brake control apparatus 550 with or without regulator 600, valves 630 and 650 function to reduce wear in strut cylinder 572 caused by the continuous movement of strut 576 responsive to movement between the sprung and unsprung portions of the railway car undercarriage. Before the train brake system is charged for operation, valve 630 is normally open as shown in FIG. 9 at the urging of spring 648. When the train brake system is charged for operation, the force generated by the pressure in brake line 20 applied to one face of piston 636 overcomes the opposition of spring 648 to close valve 630 in conduit 568. In this regard it is pointed out that the railway car can be loaded either before or after the brake system charging procedure. A vacuum is formed between valves 630 and 650, and strut cylinder 572 to prevent further extension of strut 576 in response to relative movement between the sprung and unsprung portions of the undercarriage.

While further extension of strut 576 would not be possible until release of the pressure in brake line 20, further inward translation of strut 576 could occur because the fluid displaced thereby would pass through check valve 650. Thus, valves 630 and 650 serve as a fluid ratchet by which unnecessary movement and wear of O-ring 582 is prevented. Strut 576 simply assumes and continues its innermost displacement with respect to strut cylinder 572.

It is pointed out that reservoir 588 must be connected to conduit 568 on the opposite side of valves 630 and 650 so that the necessary vacuum between said valves and strut cylinder 572 is maintained. If desired, regulator 600 could be utilized in conjunction with valves 630 and 650 in apparatus 550. However, regulator 600 would also have to be connected between valves 630 and 650, and control valve 302' at either of the locations designated 654. In addition, variable chamber 593 could be connected at either location designated 654 to take up fluid slack between strut cylinder 572 and valve 302'. In all other respects, brake control apparatus 550 incorporating valves 630 and 650 functions the same as hereinbefore described.

Referring now to FIG. 13, there is shown a modification of the strut cylinder of the brake control apparatus 550 which can be used with loaded, empty or partially loaded railway cars. FIG. 13 shows strut cylinder 660 connected to control valve 302' by conduit 568. Strut cylinder 660 is of sectionalized construction and consists of upper body 662 and lower body 664. Bodies 662 and 664 are secured together by conventional means.

Disposed within strut cylinder 660 is diaphragm assembly 666. Diaphragm assembly 666 includes diaphragm 668, the outer periphery of which is clamped between bodies 662 and 664. The inner periphery of diaphragm 668 is clamped between the lower face of diaphragm follower 670 and the upper face of diaphragm nut 672, which threadably engages diaphragm follower 670. Thus, it will be seen that diaphragm 668 flexibly suspends diaphragm assembly 666 within strut cylinder 660. Diaphragm assembly 668 separates upper chamber 674 from lower chamber 676 in strut cylinder 660. Lower chamber 676 includes strut 678 extending therefrom and mounted for translation in bushing 680. Spring 682 is disposed within chamber 676 between strut 678 and diaphragm assembly 666. Strut 678 is responsive to the relative positioning of the sprung and unsprung portions of a railway car undercarriage to compress spring 682, which causes a proportionate force to be exerted on diaphragm assembly 666. Vent 684 is provided in chamber 676 to relieve any back pressure therein whereby the only force from chamber 676 is that from compressed spring 682.

Lower chamber 676 fluidly communicates with upper chamber 674 through coaxial bore 686 in diaphragm assembly 666. Chamber 674 is connected to annular space 562 in control valve 302' through conduit 568. Plug member 688 includes a bore 690 which is coaxial with bore 686 in diaphragm assembly 666. Bore 690 of plug member 688 is in fluid communication with brake line 20 by means of conduit 692.

Valve assembly 694 is disposed within upper chamber 674 between plug member 688 and diaphragm assembly 666. Valve assembly 694 includes a valve stem 696, the lower end of which is flexibly coupled to valve body 698 to allow limited axial translation therebetween. Valve body 698 is positioned for seating engagement with one end of bore 686 in diaphragm assembly 666. Spring 700 is preferably provided between a collar on stem 696 and valve body 698 to urge valve body 698 into seated engagement with diaphragm assembly 666. The upper end of valve stem 696 includes a rigid valve body 702 which seats within bore 690 of plug member 688. Spring 704 is preferably provided to bias valve body 702 normally closed. Valves 698 and 702 are flexibly interconnected in accordance with the preferred construction, although a rigid interconnection can be utilized if desired. The provision of a lost motion connection between valves 698 and 702 prevents undesirable pressure loss caused by vibration or bouncing of strut 678 during train operation. It will thus be apparent that, subject to the action of valve assembly 694, conduit 568 can be closed, connected to brake line 20, or open to atmosphere.

The operation of brake control apparatus 550 when utilizing strut cylinder 660 proceeds as follows. It will be understood that apparatus 550 functions both before and during charging of the train brake system for operation as previously described with regard to brake control apparatus 300, with the exception that strut cylinder 660 is responsive to the pressure in brake line 20. FIG. 13 depicts strut cylinder 660 in a charged and ready condition with strut 678 fully extended.

In the case of an empty railway car, the sprung and unsprung portions of the undercarriage do not occupy a closer relative position which would cause strut 678 to be pushed into strut cylinder 660. Strut 678 is thus fully extended whereby no upward force is exerted against diaphragm assembly 666. Chamber 674 is therefore open through valve 698 to atmosphere, but closed by valve 702 to communication with brake line 20. No additional pressure is therefore exerted by strut cylinder 660 against diaphragm assembly 316'. There being no effect from strut cylinder 660, it will be seen that the pressure drop signal actuating the brakes of an empty railway car through brake line 20 is smaller than the pressure drop which occurs in brake pipe 18 by the inverse ratio of the areas of diaphragm assembly 316' abutting chambers 338' and 336', respectively, as was hereinbefore discussed.

The primary advantage in using strut cylinder 660 with brake control apparatus 550 occurs during the brake application to a partially or fully loaded railway car. As usual, operation of a remote brake valve (not shown) causes a desired pressure drop in brake pipe 18 and supply chamber 336' of control valve 302'. However, since the railway car is loaded, the sprung and unsprung portions of its undercarriage occupy closer relative positions pushing strut 678 into strut cylinder 660. The inward position of strut 678 compresses spring 682 to exert an upward force on diaphragm assembly 666. Diaphragm assembly 666 shifts upward closing valve 698 and opening valve 702. The higher pressure of brake line 20 is therefore introduced into chamber 674. The pressure rises in chamber 674 shifting diaphragm assembly 666 downward to counteract the force of spring 682. When diaphragm assembly 666 regains equilibrium valves 702 and 698 are both closed. The surface areas of diaphragm assembly 666 can be equal or different, as desired, to achieve relative conditions thereacross for equilibrium. It will thus be apparent that the pressure residing in chamber 674 and applied through conduit 568 to diaphragm assembly 316' equals or is directly proportional to the compressive force of spring 682, which corresponds to the loading condition of the railway car. In accordance with the preferred construction, the spring constant of spring 682 is such that the additional pressure exerted by strut cylinder 660 is sufficient to hold diaphragm assembly 316' down and valve 376' open when the car is fully loaded so that the pressure drop signal actuating the brakes through brake line 20 of a fully loaded car is identical to the pressure drop in brake pipe 18. Consequently, the pressure drop signal actuating the brakes of a partially loaded railway car through brake line 20 is a brake signal between that corresponding to an empty car and that corresponding to a fully loaded car.

With regard to releasing the brakes on a loaded railway car with brake control apparatus 550 and strut cylinder 660, operation of a remote brake valve (not shown) raises the pressure in brake pipe 18 and brake line 20 simultaneously since there is a direct open circuit therebetween. Brake release is thus effected and the system is reset for the next application. It will be understood that the same pressure is maintained in chamber 674 and conduit 568 for each given car loading until the car is unloaded allowing valve 698 to open.

Having reference to FIG. 14, there is shown a modification of brake control apparatus 550 which can be used with loaded, empty or partially loaded railway cars. FIG. 14 shows valve 720 connected in conduit 692 between strut cylinder 660 and control valve 302'. Valve 720 is particularly useful when valves 698 and 702 of valve assembly 694 are rigidly interconnected. Retainer spring 704 is provided in bore 690 to urge valve 702 closed. However, it will be apparent that the vibration and bouncing which normally occurs during train operations is transferred by strut 678 to diaphragm assembly 666. Although valve 698 is normally open as shown in FIG. 14, some bouncing may unseat valve 702 to cause an undesirable pressure loss in brake line 20. However, any undesirable pressure loss from brake line 20 through conduit 692 is prevented by the addition of valve 720 therein.

Valve 720 comprises a body 724 of sectionalized construction. The outer periphery of a diaphragm 726 is clamped between the sections of body 724 to divide valve 720 into first and second chambers 728 and 730. Chamber 728 communicates through conduit 732 with pressure accumulator 366'. Chamber 730 is connected to brake pipe 18 through conduit 734. Valve body 736 extends from diaphragm 726 to open or close conduit 692. O-ring 738 is provided in body 724 to form a sliding seal between the stem of valve body 736 to prevent pressure leakage between chamber 728 and conduit 692. Spring 740 provided in chamber 730 urges valve 736 closed. Fluid communication through conduit 692 is thus subject to the action of valve 720.

The operation of apparatus 550 in conjunction with strut cylinder 660 and valve 720 proceeds as follows. During operation of the system, the pressure in chamber 728 is always that of pressure accumulator 366', which never drops below that of fully charged brake pipe 18. On the other hand, chamber 730 is subject to the pressure drops in brake pipe 18. During operation of the system without brake application, the pressures in chambers 728 and 730 are approximately equal whereby spring 740 closes valve 720. When the pressure in brake pipe 18 is reduced for a brake application, valve 720 opens to allow communication between brake line 20 and strut cylinder 660. Consequently valve 720 is responsive to pressure reductions in brake pipe 18 to connect strut cylinder 660 with brake line 20 only during times of brake application. At all other times valve 720 is closed preventing pressure loss from brake line 20 through strut cylinder 660 due to vibration and bouncing. In all other respects, apparatus 550 in conjunction with strut cylinder 660 and valve 720 operates as was hereinbefore described with regard to FIG. 13.

Referring now to FIG. 15, there is shown another modification of the strut cylinder of brake control apparatus 550 which can be used with loaded or empty railway cars. FIG. 15 shows strut cylinder 750 connected directly to reservoir 588. Strut cylinder 750 includes a body 752 defining a chamber 754. A port in the wall of body 752 connects chamber 754 with conduit 568. Piston 756, to which strut 758 is attached, is slidably disposed within chamber 754. Piston 756 includes a peripheral annular groove for O-ring 760. O-ring 760 and resilient cup 762 form a sliding seal between piston 756 and the interior surface of body 752 so as to prevent leakage of fluid pressure across piston 756 between the upper and lower portions of chamber 754. A spring 762 is positioned within chamber 754 to urge piston 756 and strut 758 downwardly. In accordance with the preferred construction, spring 762 comprises a relatively light spring adequate to overcome frictional resistance so as to maintain strut 758 in extended condition.

Hollow body 764 is secured to piston 756 in coaxial relationship with a port in the top of body 752 connecting reservoir 588 and strut cylinder 750. A resilient cup 766 is secured to body 752 in surrounding relationship with body 764 to prevent fluid leakage thereacross. Upper port 768 in body 764 is exposed to permit fluid communication between reservoir 588 and chamber 754 when strut 758 is fully extended corresponding to an empty railway car. When the railway car is loaded, port 768 is pushed beyond cup 766 to a position within reservoir 588 and is thus ineffective. During inward translation of strut 758, there is no fluid communication through lower port 770 in hollow body 764 because check valve 772 within body 764 is held closed by the increased pressure in chamber 754. Check valve 772 in its simplest form may consist of a spherical valve member biased by a light spring.

It will thus be apparent that strut cylinder 750 when substituted for strut cylinder 572 in apparatus 550 eliminates the need for chamber 593 connected to conduit 568. When the railway car is unloaded, any fluid displaced by diaphragm assembly 316' is permitted to move through port 768 between conduit 568 and reservoir 588. When the railway car is fully or partially loaded, this passageway is closed and apparatus 550 incorporating strut cylinder 750 functions as an on/off device just as was hereinbefore described with regard to the device shown in FIG. 7.

Referring now to FIGS. 16 and 17, there is shown another variation of the strut cylinder in the brake control apparatus 550 which can be used with loaded, empty or partially loaded railway cars. FIG. 16 shows strut cylinder 780 which is connected to annular space 562 of control valve 302' by conduit 568. Strut cylinder 780 is of sectionalized construction and comprises hollow main body 782 to which are attached structures 784 and 786. Control valve 302' together with strut cylinder 780 effect a proportional pressure drop through brake line 20 for partially loaded railway cars for all pressure reductions in brake pipe 18. That is, strut cylinder 780 enables proportional pressure drop signals to be transmitted to the brakes of a partially loaded railway car for any brake pipe pressure reduction, instead of just those brake pipe pressure reductions greater than a predetermined minimum as is the case in apparatus 550 with strut cylinder 572 and regulator 600.

Strut cylinder 780 includes strut 788 extending therefrom and mounted for translation in bushing 790 secured to the bottom of main body 782. A contact nut 792 is threadably secured to the lower end of strut 788, which is responsive to the relative positioning of the sprung and unsprung portions of the railway car undercarriage. Inside main body 782, wheels 794 and 795 are rotatably supported near the upper end of strut 788. As is best shown in FIG. 17, two outside wheels 794 and one middle wheel 795 are utilized in the preferred embodiment of the invention. The middle wheel 795 is of relatively larger diameter than the outside wheels 794 and rollingly engages the inside wall of main body 782. The outside wheels 794 rollingly engage arm 796, which is supported within main body 782. In the preferred construction, arm 796 includes a slot extending substantially the length of one edge for receiving and guiding middle wheel 795 of strut 788. It will thus be apparent that strut 788 is movably mounted in strut cylinder 780 for rolling contact between body 782 and arm 796. Spring 798 is provided within main body 782 so that strut 788 always assumes the outermost possible position responsive to the relative positioning of the sprung and unsprung portions of the railway car undercarriage. As will be more fully explained hereafter, wheels 794 and 795 on strut 788 function as a movable fulcrum for arm 796.

The upper end of arm 796 is pivotally supported from one end of diaphragm follower 800 extending through the side of main body 782. The other end of diaphragm follower 800 is threaded for engagement with diaphragm nut 802 to securely clamp the inner periphery of diaphragm 804. The outer periphery of diaphragm 804 is securely clamped between the two casing sections comprising structure 784. Structure 784 is thus divided by diaphragm 804 into left chamber 806 and right chamber 808. Left chamber 806 is open to atmosphere through port 810. Right chamber 808 is connected through conduit 568 to annular space 562 of control valve 302'. Right chamber 808 can also be selectively connected to brake cylinder line 20 through conduit 812 by valve 814. Valve 814 is normally closed by spring 816 as shown in FIG. 16. In addition, coaxial bores are provided in diaphragm follower 800 and diaphragm nut 802 whereby fluid communication between chambers 806 and 808 can be selectively established by valve 818. Valve 818 is closed as shown in FIG. 16 when diaphragm 804 is in equilibrium. Preferably, valves 814 and 818 are rigidly interconnected. Therefore, it will be apparent that movement of diaphragm 804 to the right opens valve 814 while valve 818 remains closed. Movement of diaphragm 804 to the left opens valve 818 while valve 814 remains closed.

The force applied to structure 784 through arm 796 varies in accordance with the interaction between structure 786 and strut 788. The outer periphery of diaphragm 820 is securely clamped between the casing sections comprising structure 786. The inner periphery of diaphragm 820 is securely clamped between diaphragm follower 822 and diaphragm nut 824. Structure 786 is thus divided by diaphragm 820 into a left chamber 826 and a right chamber 828. In the preferred embodiment, the right chamber 828 communicates via conduit 829 with pressure accumulator 366'. Chamber 828 is thus maintained at a constant pressure approximately equal to the pressure in brake pipe 18. Alternatively, a suitable spring (not shown) could be substituted for the predetermined pressure in chamber 828 to effect constant biasing of diaphragm 820. On the other hand, left chamber 826 is connected through conduit 830 to the brake pipe 18. A portion of diaphragm follower 822 extends through main body 782 and engages a notch in the lower end of arm 796. Preferably, an O-ring 832 is provided in main body 782 to form a sliding seal with the extending portion of diaphragm follower 822 so as to prevent pressure leakage from left chamber 826. Therefore, it will be appreciated that the force exerted on structure 784 by structure 786 through arm 796 varies in accordance with the position of strut 788 which functions as a movable fulcrum point.

The operation of brake control apparatus 550 incorporating strut cylinder 780 proceeds as follows. It will be understood that control valve 302' functions both before and during charging of the train brake system for operation as previously described with regard to brake control apparatus 300, with the exception that strut cylinder 780 employs the pressures in both brake pipe 18 and brake line 20. FIG. 16 depicts strut cylinder 780 in a charged and ready condition with strut 788 fully extended.

In the case of an empty railway car, the sprung and unsprung portions of the undercarriage do not occupy closer relative positions. Strut 788 is thus fully extended so that the common rotational axis of wheels 794 and 795 is positioned directly opposite to the extending portion of diaphragm follower 822. It will be understood that this dead center positioning of strut 788 for the unloaded condition comprises a significant feature of the present invention. Since left chamber 826 of structure 786 is connected to brake pipe 18 through conduit 830, the same pressure reduction in brake pipe 18 would also occur in chamber 826. Right chamber 828 of structure 786 remains at the relatively higher initial pressure whereupon diaphragm 820 would displace to the left and engage arm 796. However, this pivotal actuation cannot occur when the wheel 795 is positioned opposite to structure 786 as shown in FIG. 16. Consequently, structure 784 cannot be leveraged by structure 786 when the fulcrum point is so positioned. Therefore, when the railway car is unloaded, control valve 302' functions as previously described while strut cylinder 780 is inactive. Accordingly, the pressure drop signal actuating the brakes of an empty railway car through brake line 20 is smaller than the pressure drop effected by the remote brake valve in brake pipe 18 by the inverse ratio of the areas of diaphragm assembly 316' abutting chambers 338' and 336', respectively. This is graphically illustrated in FIG. 18, wherein it is assumed that the ratio of the diaphragm assembly 316' areas abutting chambers 336' and 338' is 1:2.

The primary advantage in utilizing strut cylinder 780 instead of strut cylinder 572 in brake control apparatus 550 is evident during brake application in a partially or fully loaded railway car. As usual, operation of the remote brake valve (not shown) causes a predetermined pressure drop in brake pipe 18 and supply chamber 336' of control valve 302'. However, since the railway car is loaded, the sprung and unsprung portions of the undercarriage do occupy closer relative positions whereby strut 788 is pushed inwardly. Of course, the inward position of strut 788 relocates wheels 794 with respect to arm 796. At this point, it will be understood that the same pressure decrease of brake pipe 18 is also effected in supply chamber 336' of control valve 302' as well as in left chamber 826 of structure 786 in strut cylinder 780. The relatively higher pressure of brake line 20 is present in control chamber 338' of valve 302' and conduit 812 of strut cylinder 780. The pressure in right chamber 828 of structure 786 is constant.

Responsive to the pressure differential across diaphragm 820 of structure 786, follower 822 moves leftward to fulcrum arm 796 about wheels 794 and thus actuate diaphragm follower 800 of structure 784 rightward. It will be appreciated that the position of strut 788 determines the amount of leverage structure 786 is able to effect on structure 784 through arm 796. Diaphragm 804 of structure 784 thus shifts to the right to open valve 814 as valve 818 remains closed. Fluid at the pressure of brake cylinder line 20 is thus allowed to flow through conduit 812 and into right chamber 808. As the pressure in right chamber 808 rises, diaphragm 804 of structure 784 shifts to the left until valve 814 closes whereby the forces across diaphragm 804 are equalized. Therefore, the pessure level which must be achieved in right chamber 808 of structure 784 to balance the leverage of structure 786 is proportional to the railway car loading, which corresponds to the position of strut 788. The particular pressure required in right chamber 808 of structure 784 is applied through conduit 568 to diaphragm assembly 316' of control valve 302'. By this means, a proportional fluid bias is applied to diaphragm assembly 316'.

For example, assume that the ratio of the areas of diaphragm assembly 316' abutting chambers 336' and 338', respectively, is 1:2, and that a pressure drop of twelve (12) psi is effected in the brake pipe 18. Of course, the same 12 psi pressure drop also occurs in structure 786 of strut cylinder 780. Contact nut 792 of strut cylinder 780 should be adjusted so that when the railway car is fully loaded, the fulcrum point comprising wheels 794 is positioned half way between structures 784 and 786. The lever arms being equal, 12 psi also urges diaphragm 804 of structure 784 to the right. Valve 814 is opened until sufficient pressure occupies right chamber 808 to equalize diaphragm 804. Diaphragms 804 and 820 can be of different sizes. However, in the preferred embodiment diaphragms 804 and 820 are of equal size whereby 12 psi in chamber 808 will equalize diaphragm 804. This same 12 psi is applied to diaphragm assembly 316' in a downward direction. Therefore, the total downward force on diaphragm assembly 316' is 24 psi, whereby the pressure drop in control chamber 338' necessary to effect equalization of the diaphragm assembly 316' must be 12 psi. Therefore, the pressure drop signal actuating the brakes of a fully loaded railway car through brake line 20 is identical to the initial pressure drop in brake pipe 18.

Consider, however, the situation when the railway car is loaded to 50 percent capacity. In this case, contact nut 792 should be adjusted so that strut 788 occupies a position such that the fulcrum point comprising wheel 794 is located at a point one-third of the distance between structure 786 and 784. The amount of leverage which structure 786 can exert on structure 784 is thus reduced to one-half whereby the pressure exerted on diaphragm 804 is six (6) psi. Consequently, 6 psi is admitted to right chamber 808 to balance diaphragm 804. This same 6 psi is applied through conduit 568 to diaphragm assembly 316' in a downward direction. Thus, to achieve equilibrium across the diaphragm assembly 316' the pressure in chamber 338' must drop nine (9) psi to compensate for the twelve (12) psi pressure drop in chamber 336' in addition to the six (6) psi component from strut cylinder 780. Therefore, the pressure drop signal actuating the brakes of a partially loaded railway car through brake line 20 is a proportionate brake signal in between those brake signals corresponding to unloaded and fully loaded railway cars. See FIG. 18.

It will be understood that the use of strut cylinder 780 enables proportionate braking signals to be effected for partially loaded railway cars across the entire range of brake pipe 18 pressure drops. It will also be apparent that adjustment of contact nut 792 of strut cylinder 780 allows scheduling the exact effect of said cylinder in accordance with the railway car loading.

With regard to releasing the brakes on a railway car employing strut cylinder 780 in conjunction with control valve 302', operation of the remote brake valve (not shown) brings up the pressure in brake pipe 18 and brake line 20 simultaneously via open check valve 384'. Since the pressure in chamber 826 approaches that of chamber 828 again, diaphragm 820 of structure 786 resumes the central position as shown in FIG. 16. With no leverage being exerted by structure 786 on structure 784, diaphragm 804 moves to the left opening valve 818. Some pressure from right chamber 808 of structure 784 is thus allowed to vent through port 810 until diaphragm 804 regains equilibrium and closes valve 818 as shown in FIG. 16. Brake release is thus effected, and brake control apparatus 550 is ready for the next brake application.

Thus, it is apparent that there has been provided in accordance with the invention a brake control apparatus for railway cars that fully satisfies the objects and advantages set forth above. While the invention has been described in conjunction with specific embodiments and modifications thereof, many other alternatives, modifications and variations will be apparent to those skilled in the art in view of the foregoing description. Accordingly it is intended to embrace all such alternatives, modifications and variations as fall within the spirit and scope of the invention.

What is claimed is:

1. A brake control system, interposed between a pressurized brake pressure supply line including a train brake valve and a pressurized brake cylinder line leading to the brakes of a railway car having sprung and unsprung portions, for transmitting to the brakes a predetermined pressure drop signal responsive to a pressure drop effected by the brake valve in the brake pressure supply line, which comprises:
   structure defining a supply chamber with a port connected to the brake pressure supply line;
   structure defining a control chamber with a port connected to the brake cylinder line;
   first check valve means disposed between the brake pressure supply line and the brake cylinder line for permitting fluid communication between the supply and control chambers responsive to a pressure rise signal in the brake pressure supply line until the pressures in said chambers equalize to effect brake release;
   diaphragm means movably abutting said supply and control chambers with respective surfaces of different areas;
   first valve means mounted on the diaphragm means and responsive to predetermined positioning thereof for permitting fluid flow through the diaphragm means between the supply and control chambers responsive to a pressure drop effected in the brake pressure supply line by the brake valve until the diaphragm means regains equilibrium;
   means for applying a predetermined bias to the diaphragm means urging the first valve means closed;
   structure defining a fluid bias chamber having a port and abutted in part by the movable diaphragm means; and
   strut cylinder means connected to the port of the fluid bias chamber and having a strut responsive to the relative positioning of the sprung and unsprung portions of the railway car for applying a predetermined fluid bias to the diaphragm means urging the first valve means open when the railway car is loaded so that the pressure drop in the brake cylinder line of a fully loaded railway car is substantially equal to the pressure drop effected by the brake valve in the brake pressure supply line, and so that the pressure drop in the brake cylinder line of an empty railway car is relatively smaller than the pressure drop effected by the brake valve in the brake pressure supply line by the inverse ratio of the diaphragm means surface areas abutting the control and supply chambers, respectively, and so that the pressure drop in the brake cylinder line of a partially loaded railway car is a predetermined pressure drop proportional to the loading of the railway car for all pressure drops effected in the brake pressure supply line by the brake valve.

2. The brake control system of claim 1 wherein the predetermined biasing means comprises a spring positioned in one of said supply and control chambers and means for adjustably preloading said spring.

3. The brake control system of claim 1, further including:
   a second port in the control chamber;
   structure defining an auxiliary pressure reservoir;
   means connecting the auxiliary pressure reservoir to the second port of the control chamber;
   second valve means connected between the auxiliary pressure reservoir and the control chamber, said second valve means being responsive to movement of the diaphragm means to permit fluid communication between the auxiliary pressure reservoir and the control chamber upon a pressure rise in the brake pressure supply line;
   means connecting the auxiliary pressure reservoir to the brake cylinder line; and
   second check valve means positioned in the connection means between the auxiliary pressure reservoir and the brake cylinder line for permitting fluid communication between the brake pressure supply line and the auxiliary pressure reservoir when the first check valve means is open so that the pressure in the auxiliary pressure reservoir never falls below the pressure in the brake pressure supply line.

4. The brake control system according to claim 3, further comprising means for biasing the second valve means closed.

5. The brake control system according to claim 3 wherein the first and second valve means are rigidly connected.

6. The brake control system according to claim 5 wherein the first and second valve means are connected with a lost motion type connection to allow for some movement of the diaphragm means without disturbance of the second valve means.

7. The brake control system of claim 1, further including:
   safety valve means connected across the first check valve means;
   piston means responsive to the pressure in the brake pressure supply line for urging the safety valve means closed; and
   means for applying a predetermined bias to said piston means urging the safety valve means open so that said safety valve opens to permit direct fluid communication between the brake cylinder line and the brake pressure supply line upon a relatively large pressure drop in the brake pressure supply line.

8. The brake control system of claim 1 wherein the ratio of the surface areas of the diaphragm means abutting the control and supply chambers, respectively, is about 2:1.

9. A brake control system, interposed between a pressurized brake pressure supply line including a train brake valve and a pessurized brake cylinder line leading to the brakes of a railway car having sprung and unsprung portions, for transmitting to the brakes a predetermined pressure drop signal responsive to a pressure drop effected by the brake valve in the brake pressure supply line, which comprises:

structure defining a supply chamber with a port connected to the brake pressure supply line;
structure defining a control chamber with a port connected to the brake cylinder line;
first check valve means disposed between the brake pressure supply line and the brake cylinder line for permitting fluid communication between the supply and control chambers responsive to a pressure rise signal in the brake pressure supply line until the pressures in said chambers equalize to effect brake release;
diaphragm means movably abutting said supply and control chambers with respective surfaces of different areas;
first valve means mounted on the diaphragm means and responsive to predetermined positioning thereof for permitting fluid flow through the diaphragm means between the supply and control chambers responsive to a pressure drop effected in the brake pressure supply line by the brake valve until the diaphragm means regains equilibrium;
means for applying a predetermined bias to the diaphragm means urging the first valve means closed;
structure defining a fluid bias chamber having a port and abutted in part by the movable diaphragm means; and
strut cylinder means connected to the port of the fluid bias chamber and having a strut responsive to the relative positioning of the sprung and unsprung portions of the railway car for applying a predetermined fluid bias to the diaphragm means urging the first valve means open when the railway car is loaded so that the pressure drop in the brake cylinder line of a fully loaded railway car is substantially equal to the pressure drop effected by the brake valve in the brake pressure supply line, and so that the pressure drop in the brake cylinder line of an empty railway car is relatively smaller than the pressure drop effected by the brake valve in the brake pressure supply line by the inverse ratio of the diaphragm means surface areas abutting the control and supply chambers, respectively, and so that the pressure drop in the brake cylinder line of a partially loaded railway car is a predetermined pressure drop proportional to the loading of the railway car for all pressure drops effected in the brake pressure supply line by the brake valve;
a lever arm stationary with respect to the strut;
movable fulcrum means in engagement with said lever arm and responsive to the positioning of said strut;
means responsive to a pressure drop effected in the brake pressure supply line by the brake valve for applying a predetermined input force to one end of the level arm; and
means coupled to the other end of the lever arm and responsive to the force applied therethrough for generating a fluid bias signal corresponding to the loading condition of the railway car.

10. The brake control system according to claim 9 wherein the movable fulcrum means comprises at least one roller rotatably mounted on the strut.

11. The brake control system according to claim 9 further including a contact member adjustably secured to the outer end of the strut for scheduling operation of the strut cylinder beginning with a predetermined relative positioning between the sprung and unsprung portions of the railway car.

12. The brake control system according to claim 9 wherein the means responsive to the pressure drop in the brake pressure supply line comprises:

structure defining a first chamber having a port connected to the brake pressure supply line;
structure defining a second chamber having a port connected to a constant pressure no lower than the initial pressure in the brake pressure supply line; and
diaphragm means movably abutting said first and second chambers with surfaces of substantially equal areas and including a portion in contact with the lever arm.

13. The brake control system according to claim 9 wherein the means for generating the proportional fluid bias signal comprises:

structure defining a first chamber having a port connected to atmosphere;
structure defining a second chamber having a port connected to the port of the fluid bias chamber;
diaphragm means connected to the lever arm and movably abutting said first and second chambers with surfaces of substantially equal areas;
first valve means mounted on said diaphragm means and responsive to predetermined positioning thereof for selectively permitting fluid communication between said first and second chambers upon a pressure rise in the brake pressure supply line until said diaphragm means equalizes; and
second valve means connected between the second port of the second chamber and the brake cylinder line, and responsive to movement of said diaphragm means to permit the introduction of pressure into the second chamber upon a pressure drop effected by the brake valve in the brake pressure supply line until said diaphragm means equalizes.

14. The brake control system according to claim 13 further including means for normally biasing the second valve means closed.

15. The brake control system according to claim 13 wherein the first and second valve means are interconnected.

16. A railway car brake control valve for placement between a brake pressure supply line including a train brake valve for selectively effecting pressure drop signals to apply the brakes on the railway car and a brake cylinder line leading to the brakes of the railway car, and for use in conjunction with apparatus for generating a pressure signal corresponding to the loading condition of the railway car, which comprises:

structure defining a supply chamber having a port connected to the brake pressure supply line;
structure defining a control chamber having a port connected to the brake cylinder line;
diaphragm means movably abutting the supply and control chambers with respective surfaces of different areas;
first valve means mounted on the diaphragm means and responsive to predetermined positioning thereof a pressure drop in the brake pressure supply line for permitting fluid flow between the supply and control chambers until said diaphragm means regains equilibrium;

means for applying a predetermined bias to the diaphragm means urging said diaphragm means to a position wherein the first valve means is closed;

structure defining a fluid bias chamber abutted in part by the diaphragm means and having a port for receiving the signal corresponding to the condition of railway car loading;

said diaphragm means being urged such that the first valve means is open when the railway car is loaded so that the pressure drop in the control chamber is substantially equal to the pressure drop effected by the train brake valve in the brake pressure supply line, and such that the first valve means is open until said diaphragm means regains equilibrium when the railway car is empty such that the pressure drop in the control chamber when the railway car is empty is relatively smaller than the pressure drop effected by the train brake valve in the brake pressure supply line by the inverse ratio of the diaphragm means surface areas abutting the control and supply chambers, respectively; and first check valve means responsive to a pressure rise effected in the brake pressure supply line by the train brake valve and positioned between the supply and control chambers for permitting fluid communication therebetween until the pressures therein equalize.

17. The brake control valve of claim 16 wherein the predetermined biasing means comprises a spring positioned in one of said supply and control chambers and means for adjustably preloading said spring.

18. The brake control valve of claim 16, further including:
a second port in the control chamber;
structure defining an auxiliary pressure reservoir;
means connecting the auxiliary pressure reservoir to the second port of the control chamber;
second valve means connected between the auxiliary pressure reservoir in the control chamber and responsive to movement of the diaphragm means to permit fluid communication between the auxiliary pressure reservoir and the control chamber upon a pressure rise in the brake pressure supply line; and
second check valve means connected between the auxiliary pressure reservoir and the brake pressure supply line for permitting fluid communication therebetween upon a pressure rise in the brake pressure supply line so that the pressure in the auxiliary pressure reservoir never falls below the pressure in the brake pressure supply line.

19. The brake control valve according to claim 18, further comprising means for biasing the second valve means normally closed.

20. The brake control valve according to claim 18 wherein the first and second valve means are interconnected.

21. The brake control valve of claim 16, further including:
safety valve means connected across the first check valve means;
piston means responsive to the pressure in the brake pressure supply line for urging the safety valve means closed; and
means for applying a predetermined bias to said piston means urging the safety valve means open so that said safety valve means opens to permit direct fluid communication between the brake cylinder line and the brake pressure supply line upon a relatively large pressure drop in the brake pressure supply line.

22. A strut cylinder for producing a pressure signal in accordance with the loading condition of a railway car with sprung and unsprung portions in a train having a brake pressure supply line, a brake cylinder line, and a proportional brake control valve interposed between the brake pressure supply line and the brake cylinder line, which comprises:
a casing affixed to the railway car;
a strut mounted for translation with respect to said casing and having an outer end extending from the casing;
said strut being responsive to the relative positioning of the sprung and unsprung portions of the railway car so that the position of said strut corresponds to the loading condition of the car;
a lever arm disposed within the casing;
at least one roller means rotatably mounted on the strut and in engagement with said lever arm to function as a movable fulcrum for the lever arm;
means responsive to a pressure drop in the brake pressure supply line for applying a predetermined input force to one end of the lever arm; and
means coupled to the other end of the lever arm and responsive to the force applied through said arm for producing a fluid bias signal corresponding to the loading condition of the railway car.

23. The strut cylinder of claim 22 further including a contact member adjustably secured to the outer end of the strut for scheduling operation of the strut cylinder beginning with a predetermined relative positioning between the sprung and unsprung portions of the railway car.

24. The strut cylinder of claim 22 wherein the means responsive to the pressure drop in the brake pressure supply line comprises:
structure defining a first chamber having a port connected to the brake pressure supply line;
structure defining a second chamber having a port connected to a source of constant pressure no lower than the initial pressure in the brake pressure supply line; and
diaphragm means movably abutting said first and second chambers with surfaces of substantially equal areas and including a portion in contact with the lever arm.

25. The strut cylinder of claim 22 wherein the means for producing the proportional fluid biased signal comprises:
structure defining a first chamber having a port connected to atmosphere;
structure defining a second chamber having a port for connection with the proportional brake control valve;
diaphragm means coupled to the lever arm and movably abutting said first and second chambers with surfaces of substantially equal area;
first valve means mounted on said diaphragm means and responsive to predetermined positioning thereof for selectively permitting fluid communication between said first and second chambers upon a pressure rise in the brake pressure supply line until said diaphragm means equalizes; and second valve means connected between the second port of said second chamber and the brake cylinder line, and responsive to movement of said diaphragm means to permit the introduction of pressure into the second chamber upon a pressure drop effected by the brake valve in the brake pressure supply line until said diaphragm means equalizes.

26. The strut cylinder of claim 22 further including means for biasing the second valve means normally closed.

27. The strut cylinder of claim 22 wherein the first and second valve means are interconnected.

UNITED STATES PATENT AND TRADEMARK OFFICE
CERTIFICATE OF CORRECTION

PATENT NO. : 4,169,634
DATED : October 2, 1979
INVENTOR(S) : William R. King

It is certified that error appears in the above-identified patent and that said Letters Patent are hereby corrected as shown below:

Column 7, line 31, change "diaphragm" to --with diaphragm--.
Column 13, line 45, change "220" to --200--
Column 14, line 47-48, change "corresponding" to
--correspondingly--.
Column 18, line 35, change "388" to --338--.
Column 18, line 66, change "by" to --to--.
Column 25, line 36, after "pushing", insert --strut--.
Column 25, line 49, change "376" to --376'--.
Column 26, line 40, change "effect" to --affect--.
Column 26, line 48, change "chamber" to --chambers--.
Column 27, line 27, after "diaphragm", insert --assembly--.
Column 28, line 55, after "fashion", insert --with--.
Column 35, line 61, change "actuate" to --actuates--.
Column 36, line 4, change "pessure" to --pressure--
Column 39, line 3, change "pessurized" to --pressurized--
Column 39, line 56, after "value;", insert --said strut cylinder means further including:--

Signed and Sealed this

Eighteenth Day of December 1979

[SEAL]

Attest:

SIDNEY A. DIAMOND

Attesting Officer

Commissioner of Patents and Trademarks